US012354596B1

(12) United States Patent
Zhong et al.

(10) Patent No.: US 12,354,596 B1
(45) Date of Patent: *Jul. 8, 2025

(54) CENTRALIZED FEEDBACK SERVICE FOR PERFORMANCE OF VIRTUAL ASSISTANT

(71) Applicant: Amazon Technologies, Inc., Seattle, WA (US)

(72) Inventors: Gary Zhong, Seattle, WA (US); Milo Oostergo, Eemnes (NL); Cassity Barrows Queen, Seattle, WA (US); Aakarsh Nair, Lynnwood, CA (US); Collin Charles Davis, Seattle, WA (US); Yu-Hsiang Cheng, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/829,971

(22) Filed: Jun. 1, 2022

Related U.S. Application Data

(63) Continuation of application No. 16/219,382, filed on Dec. 13, 2018, now Pat. No. 11,355,098.

(51) Int. Cl.
*G10L 15/01* (2013.01)
*G10L 15/18* (2013.01)
*G10L 15/22* (2006.01)

(52) U.S. Cl.
CPC ............. *G10L 15/01* (2013.01); *G10L 15/18* (2013.01); *G10L 15/22* (2013.01); *G10L 2015/225* (2013.01); *G10L 2015/227* (2013.01)

(58) Field of Classification Search
CPC ......... G10L 15/01; G10L 15/18; G10L 15/22; G10L 2015/225; G10L 2015/227
See application file for complete search history.

(56) References Cited

U.S. PATENT DOCUMENTS 7,721,310 B2    5/2010 Schaffer et al.
9,171,251 B2 *  10/2015 Camp ..................... H04W 4/38
(Continued)

OTHER PUBLICATIONS

Office Action for U.S. Appl. No. 16/219,382, mailed on Jan. 29, 2021, Zhong, "Centralized Feedback Service for Performance of Virtual Assistant", 30 Pages.

(Continued)

*Primary Examiner* — Linda Wong
(74) *Attorney, Agent, or Firm* — Nicholson De Vos Webster & Elliott LLP

(57) ABSTRACT

This disclosure describes a feedback service that collects feedback for skills, or capabilities, of a virtual assistant that interacts with users, and associates the feedback with the appropriate skills. Virtual assistants interact with users via voice-enabled devices that are backed by voice-processing systems that support various skills of the virtual assistants. Due to large numbers of skills, users are unable to determine which skill is invoked during interactions with virtual assistants, and are thus unable to provide feedback for the skill. The techniques described herein include continuing a speech dialogue with a user after completion of an interaction, and requesting feedback regarding the interaction. Additionally, the techniques may include collecting contextual data for the interaction (e.g., dropped packets, latency caused by jitter, etc.). The feedback service can associate the feedback and contextual data with the particular skill used in the interaction to improve the functioning of the virtual assistant.

12 Claims, 9 Drawing Sheets

(56) References Cited

U.S. PATENT DOCUMENTS

| | | |
|---|---|---|
| 2004/0039814 A1* | 2/2004 | Crabtree ............. G06F 16/9538 709/224 |
| 2004/0153389 A1 | 8/2004 | Lortscher, Jr. |
| 2009/0013002 A1 | 1/2009 | Eggink et al. |
| 2014/0278413 A1 | 9/2014 | Pitschel et al. |
| 2016/0188738 A1* | 6/2016 | Gruber ................. G06F 16/248 707/769 |
| 2018/0192108 A1 | 7/2018 | Lyons et al. |
| 2018/0307687 A1 | 10/2018 | Natkin et al. |
| 2019/0068747 A1 | 2/2019 | Lervik et al. |
| 2019/0122092 A1 | 4/2019 | Haines et al. |
| 2019/0205386 A1 | 7/2019 | Kumar et al. |
| 2019/0267026 A1 | 8/2019 | Krinsky et al. |
| 2019/0295544 A1* | 9/2019 | Garcia .................... G06F 3/167 |
| 2020/0184956 A1 | 6/2020 | Agarwal et al. |

OTHER PUBLICATIONS

Office Action for U.S. Appl. No. 16/219,382, mailed on Jul. 24, 2020, Zhong, "Centralized Feedback Service for Performance of Virtual Assistant", 20 Pages.

Office Action for U.S. Appl. No. 16/219,382, mailed on Nov. 8, 2021, Zhong, "Centralized Feedback Service for Performance of Virtual Assistant", 11 pages.

Office Action for U.S. Appl. No. 16/219,382, mailed on May 13, 2021, Zhong, "Centralized Feedback Service for Performance of Virtual Assistant", 22 pages.

* cited by examiner

CENTRALIZED FEEDBACK SERVICE FOR PERFORMANCE OF VIRTUAL ASSISTANT

RELATED APPLICATIONS

This application claims priority to and is a continuation of U.S. patent application Ser. No. 16/219,382, filed on Dec. 13, 2018, the entire contents of which are incorporated herein by reference.

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many devices are now capable of receiving and responding to voice commands, including desktops, tablets, entertainment systems, and portable communication devices. Often, these voice-enabled devices utilize a virtual assistant with which users can have dialogues and issue voice commands to perform actions on their behalf. Due to the ease of interacting with devices using voice commands, providers of voice-enabled devices continue to introduce new capabilities, or "skills," for the virtual assistants that increase the usefulness of voice-enabled devices. For instance, users can use voice commands to instruct virtual assistants associated with the voice-enabled devices to perform various actions based on the skills of the virtual assistants, such as facilitating voice calls or video calls, performing online shopping, providing users with cooking recipes, streaming music, providing users with daily news briefings, and so forth.

To support the different capabilities or skills of the virtual assistants, the voice-enabled devices stream audio data representing voice commands of users to cloud-based voice-processing systems. The voice-processing systems can perform natural language processing techniques on the audio data, such as automatic speech recognition (ASR) and natural language understanding (NLU), to determine intents of voice commands of users. To determine an appropriate action to take to respond to the voice commands, the voice-processing systems maintain, provide, store, and/or otherwise manage large numbers of skills (or skill interfaces) that map intents to appropriate commands, or directives, to respond to the voice commands of the users. While the large number of skills provided by a voice-processing system can increase the capabilities of virtual assistants that interact with users via voice-enabled devices, it can be difficult to monitor and improve the performance of the large number of skills. Accordingly, voice-processing systems often balance the number of skills for virtual assistants with maintaining high levels of user satisfaction with the virtual assistants.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
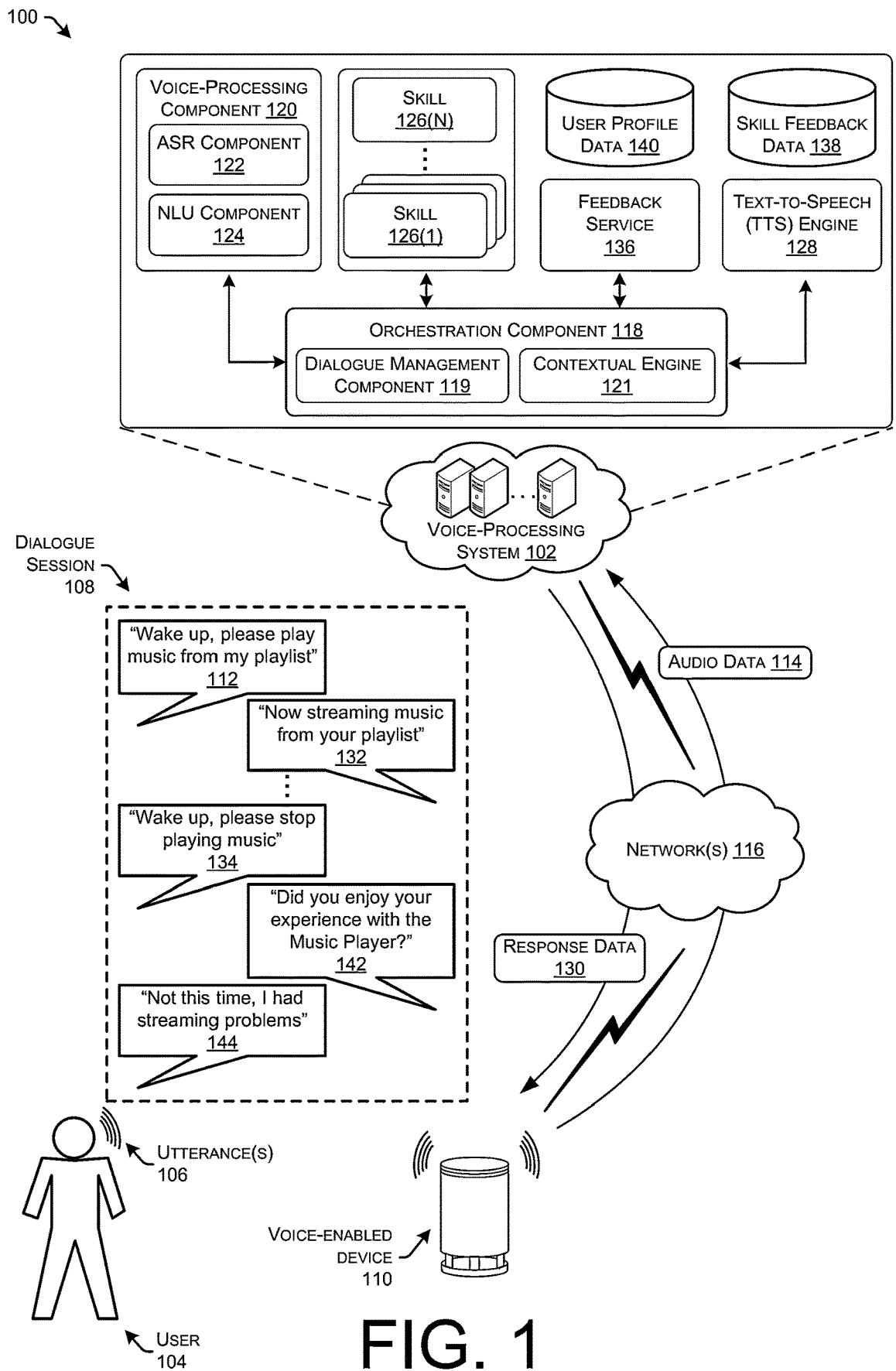
FIG. 1 illustrates a system-architecture diagram of an example environment in which a user speaks a voice command to a voice-enabled device that includes a request for a virtual assistant to perform an action. After performance of the action, the virtual assistant requests that the user provide feedback about the action, and associates the feedback with the skill or the virtual assistant that was used to perform the action.

This disclosure describes, at least in part, techniques for providing a centralized feedback service to seamlessly collect feedback data for skills of a virtual assistant used to interact with a user, determine or collect contextual data for the action performed using the virtual assistant, and associate the feedback data and contextual data with the appropriate skill of the virtual assistant. In some examples, an action performed by the virtual assistant may include using a skill to conduct a session with a user, such as establishing and managing a communication session (e.g., voice call, video call, etc.) or an interactive session (e.g., reading a cooking recipe, performing online shopping, etc.). According to the techniques described herein, the voice-processing system supporting the virtual assistant that interacts with users via voice-enabled devices may determine when the sessions have completed, such as identifying a voice command from a user to "please end the call." The voice-processing system may include the centralized feedback service that identifies or detects the command to complete the session managed by the virtual assistant, and rather than simply notifying the user that the session has been ended, continue the speech dialogue with the user to obtain feedback. For instance, the feedback service may cause the virtual assistant to continue the dialogue by subsequently asking the user for feedback, such as causing the voice-enabled device to output "did you like the call experience," to help ensure that the user provides feedback that can be linked to the session facilitated by the virtual assistant, and thus the underlying skill. The voice-enabled device can then stream audio data representing the response of the user back to the cloud-based feedback service.

Further, the feedback service can collect contextual data for the session, such as packet loss for the video call, latency in the video data packets caused by jitter, and/or other contextual data that may indicate a quality of the session. The feedback service may then associate the feedback data and/or contextual data with the skill of the virtual assistant that was utilized to perform the action, such as facilitating the session. In this way, the feedback service can receive feedback data and contextual data for an action, such as a session, performed by a virtual assistant, and map, link, or otherwise associate feedback data and/or contextual data with the appropriate skill in order to monitor skill performance, and in turn improve skill performance of virtual assistants. Generally, the skill performance for virtual assistants indicates how well skills perform the operations or actions they are programmed or configured to perform. In some examples, the skill performance may be based on how well or accurately the skills of the virtual assistants respond to voice commands of users. For instance, user feedback may indicate that the skill performance of a skill is good if the virtual assistant performs the requested operations, and the skill performance of a skill may be bad if the virtual assistant performs the wrong operation for a voice command, or does not understand the voice command. In some examples, skill performance may be based on how well the skill performs technically, or based on its capabilities. For instance, a skill for streaming music may perform poorly if the music sounds choppy, or if music is played in response to a voice command of a user that is the wrong music, or not the intent of the user. As another example, a skill for providing map directions may perform poorly if the map directions skill provides directions to the wrong location, or provides a slow route. These are merely examples of how performance of skills of a virtual assistant may be good, bad, and so forth.

The techniques described herein may be utilized with any type of user device (e.g., phones, tablets, display devices, etc.). For instance, with the proliferation of sound-controlled computing devices, sometimes referred to herein as "voice-enabled devices" (or "voice-controlled devices"), users are able to interact with one or more of their computing devices through speech or other sounds. These devices include microphones, speakers, displays, and other components to interact with a user. For instance, voice-enabled devices may include at least one microphone to receive/capture voice commands or other utterances from a user, and may also include at least one speaker to facilitate a dialogue or conversation with a user. Voice-enabled devices may include such components such that a user may utter a command or make other types of sound(s), which are sometimes referred to herein as "voice commands," via speech or other types of sounds to a voice-enabled device. In response, the device by itself and/or with other computing systems (e.g., remote communications systems, remote voice-processing systems, etc.) performs at least one operation, such as turning on/off an appliance, streaming music, performing a telephone call, and so forth. Due to the usefulness of voice-enabled devices, new capabilities or skills for virtual assistants provided via the voice-enabled devices may continue to be introduced.

Generally, a user may interact with a virtual assistant by uttering a voice command, or by providing other input, to a voice-enabled device. The user may request that the virtual assistant perform various operations or actions that are supported by skills or capabilities of the virtual assistant. The voice-enabled devices may determine that the user is issuing a voice command, such as by detecting a predefined wakeword, and begin generating audio data using a microphone to stream to a remote, cloud-based voice-processing system. While the voice-enabled devices may perform some pre-processing on the audio data representing the voice command, such as beamforming, echo cancellation, wakeword detection, etc., the voice-enabled devices may serve as an interface or "middle man" between a user and one or more remote systems, such as a voice-processing system. In this way, the more intensive processing involved in speech/voice processing may be performed using resources of remote systems, which may increase the performance of the voice-processing techniques utilized on audio data generated by the voice-enabled devices. For example, while the voice-enabled devices may be configured with components for determining that the user is issuing a voice command (e.g., a wake word detection component), the voice-enabled devices may relay the audio data representing voice commands to the voice-processing system which performs processing techniques on the audio data to determine how to respond to voice commands of the users.

Thus, in some examples, techniques described herein for performing voice processing may be performed by a voice processing or other type of remote system (e.g., "cloud-based system," "software as a service (Saas) system," "network-accessible system," etc.) which receives audio data from voice-enabled devices and is located remotely from the voice-enabled devices. Each of the voice-enabled devices may access the remote system through a communications network, such as the Internet, to provide the remote system with the captured audio data that includes a command to, for example, perform a voice call. In various examples, the voice-enabled devices may receive a "wake" trigger (e.g., wake word, button input, etc.) which indicates to the voice-enabled devices that a user is speaking a command, and the voice-enabled devices process audio data representing the spoken command locally and/or begin streaming the audio data to the network-based speech service.

Although in some embodiments the voice-enabled devices may perform the following operations, upon receiving the audio data representing the voice command, the voice-processing system may perform natural language processing techniques on the audio data to understand the voice command. For example, the voice-processing system may perform automatic speech recognition (ASR) to transcribe the audio data into text data representing the voice command, and perform natural language understanding (NLU) on the text data to determine an intent of the voice command. The voice-processing system may utilize various skills, or skill interfaces, to determine appropriate responses, commands, directives, action, operations, and so forth, for responding to the intent of the user. The skills may generally comprise mappings or associations between intents and actions to be taken by the virtual assistant to respond to the voice commands. For instance, the skills can include a maps skill for providing directions, a shopping skill to facilitate online shopping sessions, a cooking skill to provide recipes, a voice call skill to facilitate voice calls, a video conference skill to facilitate video calls, and various other skills. Each of the skills may include one or more mappings between intents and responses or commands. For instance, an intent determined for a voice command of "please end my call" may be determined to belong to the <EndCall> intent and be routed to a voice call skill that was previously associated with, or mapped to, the <EndCall> intent. The voice call skill may include a mapping for the <EndCall> intent to a directive, or command, that causes the virtual assistant to end the voice call that is established using the user's voice-enabled device.

Voice-processing systems continue to improve the performance of the skills that support the virtual assistants, or add capabilities to the virtual assistants. However, when the virtual assistants do not perform as expected by a user, the voice-processing system may desire to receive feedback from the users to help improve the performance of the virtual assistant. For instance, voice-processing systems may provide user interfaces via web-based portals that users can access and provide text-based feedback. However, unsophisticated users may be unable to navigate to the web-based portals, and many users may simply not want to put the time into providing feedback. Further, even if a user would like to provide feedback indicating that a particular skill or interaction with the virtual assistant was good or bad, due to the large number of skills supporting a virtual assistant, and because a user invokes the use of different skills using only voice, the users generally do not have knowledge of what skill is being utilized by the virtual assistant during an interaction. Thus, any feedback may not be helpful for the voice-processing system to improve the skills that support the capabilities of the virtual assistant.

According to the techniques described herein, a feedback service may perform techniques to improve virtual assistants by enabling the virtual assistants to more intelligently interact with users to receive feedback data, as well as contextual data, and associate the feedback/contextual data with the appropriate skills of the virtual assistant. Accordingly, the techniques described herein may improve the skills and capabilities of virtual assistants.

In some examples, the feedback service may monitor interactions between users and virtual assistants to identify the completion of such interactions, such as the end of a session-based interaction (e.g., dialogue exchange completion, voice/video call termination, music streaming termination, etc.). For instance, the feedback service may identify a voice command of "please hang up" as being a request to complete a call. Rather than simply completing the interaction, the feedback service may determine whether or not to request feedback from the user.

The feedback service may perform various techniques for determining whether to request feedback from the user. For instance, the feedback service may determine, for the particular skill being utilized by the virtual assistant, whether or not feedback is requested from this user based on the user's demographic information (e.g., age, education, marital status, gender, etc.). As an example, a particular skill may request feedback from an older age group due to that age group having bad experiences when interacting with the virtual assistant using the particular skill. In further examples, the feedback service may determine how frequently the user has been asked for feedback already to avoid overwhelming the user with requests. Rather than individual skills requesting feedback from users without having knowledge as to whether other skills have asked for feedback recently, the centralized feedback system may determine, for all of the skills, how frequently the user has been asked for feedback. If the feedback service determines that the user has been asked less than a threshold number of times during a period of time (e.g., less than 2 times in a week), the feedback service may determine to ask the user for feedback.

In some examples, the feedback service may also determine what types of questions to ask the user to obtain feedback. For example, if the user has requested that the feedback service ask them for feedback, and/or if the user provides feedback when requested, the feedback service may ask more detailed questions. Initially, the feedback service may simply ask the user "did you enjoy your experience with [skill name]" to prompt the user, for the name of the skill being used, to answer with a simple "yes" or "no" to provide feedback. If the user is receptive to providing feedback, or has already provided simply feedback for a skill, the feedback service may ask questions for more detailed feedback, such as "what can your virtual assistant do to improve your experience using [skill name]," or the like. In this way, the feedback service may intelligently collect feedback from a user as part of a dialogue interaction between the user and the virtual assistant at completion of the interaction.

In some instances, the feedback service may collect contextual data regarding the interaction between the virtual assistant and the user to provide context around the feedback data. For instance, for a communication session (e.g., voice call, video call, music streaming, etc.), the feedback service can collect contextual data, such as packet loss, latency in the data packets caused by jitter, and/or other contextual data that may indicate a quality of the session. As another example, the feedback service may collect data indicating failed attempts for the virtual assistant to properly understand and/or respond to a user's request. The feedback service may collect this contextual data, if available, for the interactions between users and virtual assistants when utilizing skills for which feedback is requested or desired.

Once the feedback data and/or contextual data is collected for an interaction between a user and a virtual assistant, the feedback service may map or otherwise associate the data with the skill invoked for the interaction. For instance, the feedback service may transcribe the feedback data into text data and place the text data representing the feedback, and the contextual data, in a review queue or list for the skill. In some examples, the feedback service may send the text data and/or contextual data to a device associated with a developer and/or manager of the particular skill. In this way, the feedback data and/or contextual data for interactions may be associated with the appropriate skill, and later utilized to help improve the functioning of the skill, and in turn the virtual assistant.

The techniques described herein improve the abilities and functioning of voice-enabled devices in various ways. For instance, voice-processing systems were previously unable to efficiently and accurately collect feedback for skills of virtual assistants. Thus, the voice-processing systems were unable to determine which skills the user was particularly pleased with, or unhappy with. Rather, users would simply provide feedback indicating that they were pleased, or unhappy, with the virtual assistant, but without any indication of which skill was being utilized. Thus, voice-processing systems were unable to identify, and improve, skills of the virtual assistant that users were unhappy with. However, using the techniques described herein, voice-processing systems may collect feedback and contextual information for skills that can be analyzed to improve the functioning of skills and virtual assistants.

Additionally, the techniques described herein solve a problem rooted in computer technology using a solution rooted in computer technology. For example, virtual assistants are enabled to perform various actions or operations due to large numbers of skills maintained by the voice-processing system. Traditionally, to provide feedback for a specific skill, the user may have to access a web-based portal and identify the particular skill that was used by the virtual assistant for responding to the user's voice command, and provide textual feedback. Even if a user is sophisticated and can access the web-based portal, due to the large numbers of skills, the user may be unable to determine which skill was used by the virtual assistant to interact with the user. For instance, there may be many skills, with potentially overlapping capabilities, that could be used by the virtual assistant. Accordingly, users are unable to provide feedback for skills of a virtual assistant due to the large number of skills required to maintain and implement and virtual assistant. Thus, because virtual assistants require may skills to increase the capabilities, and in some instances, multiple skills are utilized for a single session, users are unable to provide feedback for skills of a virtual assistant. However, the techniques described herein provide a seamless means by which a virtual assistant may obtain feedback after a session. In this way, the user can provide accurate and timely feedback for a session, and the voice-processing system can associate, map, or otherwise link the feedback and/or contextual data with the skill(s) utilized by the virtual assistant during the session or interaction.

FIG. 1 illustrates a system-architecture diagram of an example environment 100 including a voice-processing system 102 and in which a user 104 speaks one or more utterances 106 to facilitate a dialogue session 108 with a virtual assistant operating on a voice-enabled device 110. The utterance(s) 106 may include a voice command 112 to the voice-enabled device 110 that includes a request for a virtual assistant to perform an action, such as "Wake up, please play music from my playlist."

Generally, the voice-enabled device 110 may comprise any type of device that includes one or more microphones to capture utterance(s) 106 of the user 104, and one or more speakers that are used to play speech (e.g., dialogue in the dialogue session 108) for the virtual assistant, and content. In some embodiments, the voice-enabled device 110 may be designed to operate from a fixed location, and in other embodiments, the voice-enabled device 110 may be portable or mobile. For instance, the voice-enabled device 110 may comprise handheld devices or other mobile devices, such as smartphones, tablet computers, media players, personal computers, wearable devices, various types of accessories, and so forth.

Depending on the capabilities, or skills, of the virtual assistant that is supported by the voice-enabled device 110, the user 104 may utter various voice commands 112. For example, the voice commands 112 can include commands to facilitate a voice/video call, shop for an item, start a timer/alarm, play a movie, operate appliances in a home, and/or other actions/operations. In the illustrated example, the user 104 issued a voice command 112 to "please play music from my playlist." In some examples, the voice-enabled device 110 may detect a predefined trigger expression or word (e.g., "wake up," "awake," a name of the virtual assistant, etc.), which may be followed by instructions or directives (e.g., "please end my phone call," "please turn off the alarm," "please play my favorite movie," etc.). The skills of, or services provided by, the voice-enabled device 110 may be supported or performed in conjunction with the voice-processing system 110 and may include performing actions or activities, rendering media, obtaining, and/or providing information, providing information via generated or synthesized speech via the voice-enabled devices 108, initiating Internet-based services on behalf of the user 104, and so forth.

Thus, the voice-enabled device 110 may detect the wake expression of "wake up" and receive or capture, via a microphone, the following sound corresponding to the voice command 112 "please play music from my playlist" in this example, but could be any other command 112. By preceding the voice command 112 with the wakeword or trigger expression that is spoken by the user 104, the user 104 is able to indicate that the subsequent speech is intended to be received and acted upon by the voice-enabled device 110 and/or voice-processing system 102. The voice-enabled device 110 may detect the wakeword and begin streaming audio data 114 (or signals) to the voice-processing system 102. In some instances, the voice-enabled device 110 may operate in a low-functionality mode and analyze sound using ASR processing. When the wakeword is detected using ASR, the voice-enabled device 110 may begin streaming the audio data 114, and other data, to the voice-processing system 102. The wakeword may be a reserved keyword that is detected locally by the voice-enabled device 110, such as by using an expression detector that analyzed audio signals produced by the microphones of the voice-enabled devices 110 using ASR techniques to detect the wakeword, which generally may be a predefined word, phrase, or other sound. Such an expression detector may be implemented using keyword spotting technology, as an example.

The audio data 114 may be sent or streamed over one or more networks 116. The network(s) 116 may include any viable communication technology, such as wired and/or wireless modalities and/or technologies. Network(s) 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)-both centralized and/or distributed-and/or any combination, permutation, and/or aggregation thereof.

The voice-processing system 102 may process audio data 114 received from the voice-enabled device 110 and formulate responses to the user 104. The voice-processing system 102 may be implemented as one or more computing devices including one or more servers, desktop computers, laptop computers, or the like. In one example, the voice-processing system 102 is configured in a server cluster, server farm, data center, mainframe, cloud computing environment, or a combination thereof. To illustrate, the voice-processing system 102 may include any number of devices that operate as a distributed computing resource (e.g., cloud computing, hosted computing, etc.) that provides services, such as storage, computing, networking, and so on.

As illustrated, the voice-processing system 102 may include various components for processing audio data 114 representing utterance(s) 106 of users 104 to determine how to respond to the users 104. The voice-processing system 102 may perform one or more natural language processing techniques on the audio data 114. The voice-processing system 102 may store various components for determining how to respond to the user 104, such as an orchestration component 118 and a voice-processing component 120. Generally, the orchestration component 118 may perform various actions for organizing (or orchestrating) the activities of the voice-processing system 102. The orchestration component 118 may stream the audio data 114 to the voice-processing component 120 to determine how to respond to the user 104. For instance, the orchestration component 118 may stream the audio data 114 to an ASR component 122 which detects a voice command 112 endpoint and sends a message to the voice-enabled device 110 to close the stream of the audio signal 114.

In some instances, the ASR component 122 of the voice-processing system 102 may process the audio data 114 at to determine textual data which corresponds to the voice command 112 in the utterance 106. In some examples, the ASR component 122 may generate ASR confidence scores representing the likelihood that a particular set of words of the textual data matches those spoken in the voice command 112. For instance, the ASR component 122 may determine a confidence or likelihood that a particular word which matches the sounds would be included in the sentence at the specified location (e.g., using a language or grammar model). Thus, each potential textual interpretation of the voice command 112 (hypothesis) is associated with an ASR confidence score. The ASR component 122 may then return the textual data to the orchestration component 118.

In various examples, the textual data corresponding to the voice command 112 in the utterance 106 may be sent from the orchestration component 118 and/or ASR component 122 to an NLU component 124 to be analyzed or processed by the NLU component 124 to determine an intent expressed by the user 104 in the utterance 106. In some examples, the NLU component 124 may include machine-learning models which have been trained using different training speech utterances to result in an NLU model that weights, or biases, the processing of text data to identify intents for the text data that are more appropriate for the device capabilities of the corresponding voice-enabled device 110.

Generally, the NLU component 124 attempts to make a semantic interpretation of the phrases or statements represented in the input text data input therein. That is, the NLU component 124 determines one or more meanings associated with the phrases or statements represented in the input text data based on individual words represented in the input text data. The NLU component 124 determines an intent (e.g., a system action that a user desires the system to perform) of a user input represented in the input text data as well as pertinent pieces of information in the input text data that allow a device (e.g., the voice-enabled device 110, the voice-processing system 102, etc.) to execute the intent. For example, if the input text data corresponds to "play music," the NLU component 260 may determine a music source from which to stream music to initiate a streaming session for the voice-enabled device 110.

The orchestrator component 118 may then provide the intent determined for the voice-command 112 to one or more skills 126 (or "speechlets") of the voice-processing system 102. Generally, the skills 126(1)-126(N) may support various capabilities of the virtual assistant to assist or provide services for the user 104.

In some examples, a skill 126 may be software running on the servers of the voice-processing system 102, similar to an application. That is, a skill 126 may enable the voice-processing system 102 to execute specific functionality in order to provide data or produce some other output requested by a user 104. The voice-processing system 102 may be configured with more than one skill 126. For example, a weather service skill 126 may enable the voice-processing system 102 to provide weather information, a car service skill 126 may enable the voice-processing system 102 to book a trip with respect to a taxi or ride sharing service, an order pizza skill 126 may enable the voice-processing system 102 to order a pizza with respect to a restaurant's online ordering system, etc. The functions provided by one or more skills 126 may overlap or be different from the functions provided by one or more other skills 126. Skills 126 may be implemented in some combination of hardware, software, firmware, etc. Types of skills 126 can include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a skill 126 may provide output text data responsive to the user's 104 utterance 106. The voice-processing system 102 may include a text-to-speech (TTS) engine 128 that generates output audio data from the skills 126 provided output text data. The TTS engine 128 may use different synthesis techniques. In one method of synthesis called unit selection, the TTS engine 128 analyzes text data against a database of recorded speech. The TTS engine 128 selects units of recorded speech (e.g., machine-generated words or text) matching the text data and concatenates the units together to form output audio data. In another method of synthesis called parametric synthesis, the TTS engine 128 varies parameters such as frequency, volume, and noise to create output audio data including an artificial speech waveform. Parametric synthesis uses a computerized voice generator, sometimes called a vocoder.

Once the intent has been determined by the NLU component 124, which may be a <Play Music> intent in this case, the appropriate skill 126 may determine an action, command, operation, directive, etc., appropriate for responding to the voice command 112. For instance, the intent may be routed to the appropriate skill 126, such as a "Movie Player" skill 126, which executes to generate or determine a command to respond to the user 104. In this example, the directive, command, etc., determined by the skill 126 may be a directive to provide the voice-enabled device 110 with an indication of a web-based location (e.g., URL, IP address, etc.) from which to stream music, as well as an indication of what music to stream for the user 104.

Once the skill 126 has determined or generated the command/directive, and/or the TTS engine 128 has determined a response, such as machine-generated words to respond to the user's 104 voice command 112, the orchestration component may send response data 130 over the network(s) 116 and to the voice-enabled device 110. In the illustrated example, the voice-enabled device 110 may cause the operation, action, session, etc., to be performed based on the response data 130. For instance, the response data 130 may include an executable instruction that causes the voice-enabled device 110 to begin streaming music data from an online location that stores the user's 104 playlist, and outputs the music data using speakers (and/or causes a secondary device to output the music data). Further, the virtual assistant may output, on the speaker of the voice-enabled device 110 TTS data comprising machine-generated words to response to the user 104. For instance, the virtual assistant may issue a replay 132 of "now streaming music from your playlist" so the user 104 is aware that their voice command 112 was processed.

The orchestration component 118 may include, or be associated with, a dialogue management component 119 that is responsible for conducting speech dialogs (e.g., dialogue session 108) with the user 104 in response to meanings or intents of user speech determined by the NLU component 124. The dialog management component 119 may include domain logic that is used to analyze the meaning of user speech and to determine how to respond to the user speech. The dialog management component 119 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

In various examples, the orchestration component 118 may further include a contextual engine 121 configured to keep track of, record, log, or otherwise determine an entire conversation between the user 104 and the virtual assistant performed by the dialogue management component 119. The contextual engine 121 may then provide the records of the conversations to the feedback service 136, which in turn maps the conversation (e.g., textual records transcribed from the audio data 114) to the appropriate skill 126. In some examples, the conversations may provide valuable contextual data for the skills 126 whose intents were invoked. For instance, if a user 104 requested "please buy bags" to invoke a Shopping Skill 126, but the skill 126 mistakenly attempted to buy "rags," the user 104 may have attempted to buy bags multiple times, and eventually determined to not buy anything using the Shopping Skill 126. By tracking the conversation and mapping it to the appropriate skill 126, the contextual information may indicate that the user 104 became frustrated that the skill 126 was not responding to their requests appropriately, and eventually decided to not order any items. In this way, the contextual engine 121 may provide context data in the form of conversation records for the feedback service 126 to map to skills 126. Additionally, the contextual engine 121 may keep track of all of the intents of the user 104 determined during a session 108 or conversation.

As the music streaming session (e.g., communication session, interactive session, or any other session) is being performed on the voice-enabled device 110, the user 104 may issue another voice command 134 of "wake up, please stop playing music 134" to stop the music streaming session. Similar to the process described above, the voice-processing system 102 may determine that the user 104 wants to stop their music from being played, and provide response data 130 to cause the device 110 to stop playing music.

However, according to the techniques described herein, the voice-processing service 102 may further include a feedback service 136 configured to collect feedback for the skills 126. For instance, the feedback service 136 (and/or another component) may be configured to detect dialogue, expressions, utterances, and/or intents that are predefined for skills 126 to identify the completion of a session, dialogue, action, exchange, etc., for the skill 126 on behalf of the user 104. For instance, phrases and/or corresponding intents for utterances 106 of "hang up" or "end the call" may indicate a completion of a session for a Call Skill 126, whereas "call Bob" or "play music" may not indicate a completion of a session. The feedback service 136, and/or another component, may identify a dialogue response or the user 104, and determine whether the particular dialogue response (e.g., utterance 106) is tagged with a feedback status, or otherwise identified as a phrase after which to request feedback. One or more of the skills 126 may have predefined dialogue responses that are indicated as being tagged with a feedback status, and they may be stored in a database for skill feedback data 138.

If the feedback service 136 determines that a particular utterance 106 of a user 104 is tagged or otherwise associated with requesting feedback, the feedback service 136 may determine to request feedback from the user as part of the dialogue session 108. In such examples, the feedback service 136 may cause the TTS engine 128 to generate audio data representing machine-generated words that, when output by a loudspeaker of the voice-enabled device, prompts the user 104 for feedback regarding the session. However, in some examples the feedback service 136 may perform one or more operations before requesting feedback from the user 104.

In some instances, the feedback service 136 may determine, for the skill 126 utilized to perform the session or action, whether or not to request feedback from the user 104 based on various user profile data 140. For instance, the voice-processing system 102 may include storage for user profile data 140 that includes a variety of information related to individual users, groups of users, etc. that interact with the system 102. The user profile data 140 may include one or more user profiles or accounts. Each user profile may be associated with a different user ID. The user profile data 140 may include various information, such as demographic information (e.g., age, gender, interests, geographic location, etc.), skill usage information (e.g., types of skills 126 used, frequencies of use of skills 126, etc.), and/or other user data. Additionally, the user profile data 140 may indicate that the profile is for a child that should, or should not, be asked for feedback for at least some of the skills 126.

The feedback service 136 may determine whether or not to request feedback from the user 104 regarding the interaction using a skill 126 based on the user profile data 140. For instance, a skill 126 may wish to obtain feedback from users 104 of a particular age range, or from a particular geographic area. As another example, a skill 126 may wish to obtain feedback from users 104 that utilize many different skills 126 with a high frequency, as they may be more sophisticated users. However, any logic may be utilized to determine whether to request feedback from a user 104 based on the user profile data 140.

Additionally, or alternatively, the feedback service 136 may analyze skill feedback data 138 to determine whether to ask for feedback from the user 104. The skill feedback data 138 may indicate a frequency at which the particular user 104 has been asked for feedback for one or more of the skills 126. The feedback service 136 may attempt to avoid overwhelming the user 104 with requests for feedback, even for different skills 126. Thus, if the user 104 has been asked for feedback more than a threshold amount of times within a threshold period of time (e.g., more than once a day, more than five times a week, etc.), the feedback service 136 may refrain from requesting feedback from the user 104. In this way, rather than individual skills 126 asking a user 104 for feedback without realizing that another skill 126 recently requested feedback, the feedback service 136 may centralize the skill feedback data 138 for all of the skills 126 and determine how frequently the user 104 has been asked for feedback regarding any one of the skills 126.

If the feedback service 136 determines to request feedback from the user 104, the TTS engine 128 may generate or determine response data 130 including audio data representing machine-generated words to be output by the voice-enabled device 110 as part of the dialogue session 108. For instance, the voice-enabled device 110 may output a reply 142 of "did you enjoy your experience with the Music Player?" where the "Music Player" is the name of the skill 126 utilized for the session. In this way, the voice-enabled device 110 may request feedback as part of a seamless dialogue session 108 after the user 104 has requested that the session or action performed using the skill 126 is completed. Depending on the skill 126, how frequently the user 104 has been asked for feedback, how often the user 104 provides feedback, whether the user 104 has previously indicated they would like to provide feedback, etc., the reply 142 may be tailored for the user 104. For instance, the feedback service 136 may, in a first reply 142, start with a "yes" or "no" question such as "Did you enjoy the shopping experience with the Shopping Service?". After some time, the feedback service 136 may ask "How do you rate your shopping experience from 1 to 5?", and after a further period of time, the feedback service 136 may ask "What can I do to improve your shopping experience?" or "What do you like the most about the Shopping Service?". In this way, questions or replies 142 may request more or less feedback from a user 104. Further, the replies may be different based on the skills 126, such as tailored to or for the capabilities provided to the virtual assistant by the skills 126. Further, the replies 142 may be modified to include the name of the skill 126 that was utilized for the session. Thus, the TTS engine 128 and/or feedback service 136 may identify a name of the skill 126, such as "Music Player," and insert that into the machine-generated words used to output the reply 142.

After the feedback is requested in the reply 142 of "Did you enjoy your experience with the Music Player?", the user 104 may provide an utterance 106 including feedback 144, such as "Not this time, I had streaming problems." The auditory feedback 144 may be captured and streamed to the voice-processing system 102 as audio data 114. The audio data 114 representing the feedback 144 may be transcribed into text (e.g., using the ASR component 122) and associated with the skill 126 utilized for the session, such as the Music Player skill 126. For instance, the text-based feedback (and/or the audio data 114 representing the recording) may be stored in a review service or queue for the skill 126, or otherwise mapped, tagged, or associated with the appropriate skill 126.

Depending on the type of action performed using a skill 126, additional contextual data associated with performance of the action (e.g., session) may be collected to indicate how well the skill 126 performed. For instance, the feedback service 136 may determine, collect, or otherwise obtain contextual data for the session, such as packet loss for the video call, latency in the video data packets caused by jitter, and/or other contextual data that may indicate a quality of the session. The feedback service 136 may then associate the feedback 144 and/or contextual data with the skill 126 of the virtual assistant that was utilized to perform the action, such as facilitating the session. In this way, the feedback service 136 can receive feedback and contextual data for an action, such as a session, performed by a virtual assistant, and map, link, or otherwise associate feedback 144 and/or contextual data with the appropriate skill 126 in order to monitor skill performance, and in turn improve skill performance of virtual assistants. For instance, admins and/or other users may analyze the feedback 144 and/or contextual data for a skill 126 and determine how to improve the skill 126, such as by making changes to the software or code of the skills 126.

In some examples, the feedback service 136 may be triggered to request feedback after the skill 126 and/or virtual assistant failed to complete the user's 104 request or command after consecutive interactions.

Although many of the techniques described herein are performed at remote server(s) of a voice-processing system 102, some or all of the components and techniques of the voice-processing system 102 may be included in the voice-enabled device 110. For instance, the voice-enabled device 110 may store and execute all of the components described herein, and need not utilize any other services or devices. In some examples, the techniques described herein are equally applicable to service providers that do not operate voice-processing systems 102. For instance, the techniques may be applicable to a video conferencing service, or any other service, that is not voice controlled, but rather utilizes traditional forms of input (e.g., keyboard, mouse, touch screen, etc.).

In various examples, the feedback service 136 may include a selection engine that is configured to utilize one or more heuristics to determine whether or not to request feedback from a particular user 104 based on various data, such as user profile data 140 and/or skill feedback data 138. For instance, the selection engine may determine a frequency at which a user, or user profile, has been prompted for feedback regarding all of the skills 126(N) of the virtual assistant, and determine if the frequency is below some threshold frequency. In this way, the selection engine may request feedback from users 104 when appropriate, and not bombard the users 104 with requests. For example, the threshold frequency may be set at two times in a seven-day period, and if the user 104 has not been asked more than two times in the seven-day period, the selection engine may select the user 104 to provide feedback for a skill 126. Additionally, the selection engine may utilize a heuristic to determine whether to request feedback from a user 104 based on a participation rating for the user 104, such as a feedback history for the user profile associated with the voice-enabled device 110. The participation rating may indicate how willing a user 104 is to provide feedback, such as a frequency or percentage at which the user profile provided feedback for the skill interfaces when prompted by the virtual assistant, requests that the user 104 be prompted for feedback in the future, etc. A more willing user 104 may be prompted for feedback more often. As another example, the selection engine may determine whether or not to request feedback from a user 104 based on the user profile data 140 including demographic information that corresponds to a characteristic of users from which feedback is to be requested for the skill 126. For example, the skill 126 may request that users 104 with certain demographics be prompted for feedback more often than other users 104 without the desirable demographics for that skill 126.

In some examples, the selection engine of the feedback service 136 may utilize one, or multiple, of the above-noted heuristics (and/or other heuristics) to determine whether or not to request that a particular user 104 give feedback for a particular skill 126. The selection engine may weight the various heuristics to make a final determination as to whether to ask a particular user 104 for feedback regarding a particular skill 126.

Figure 2:
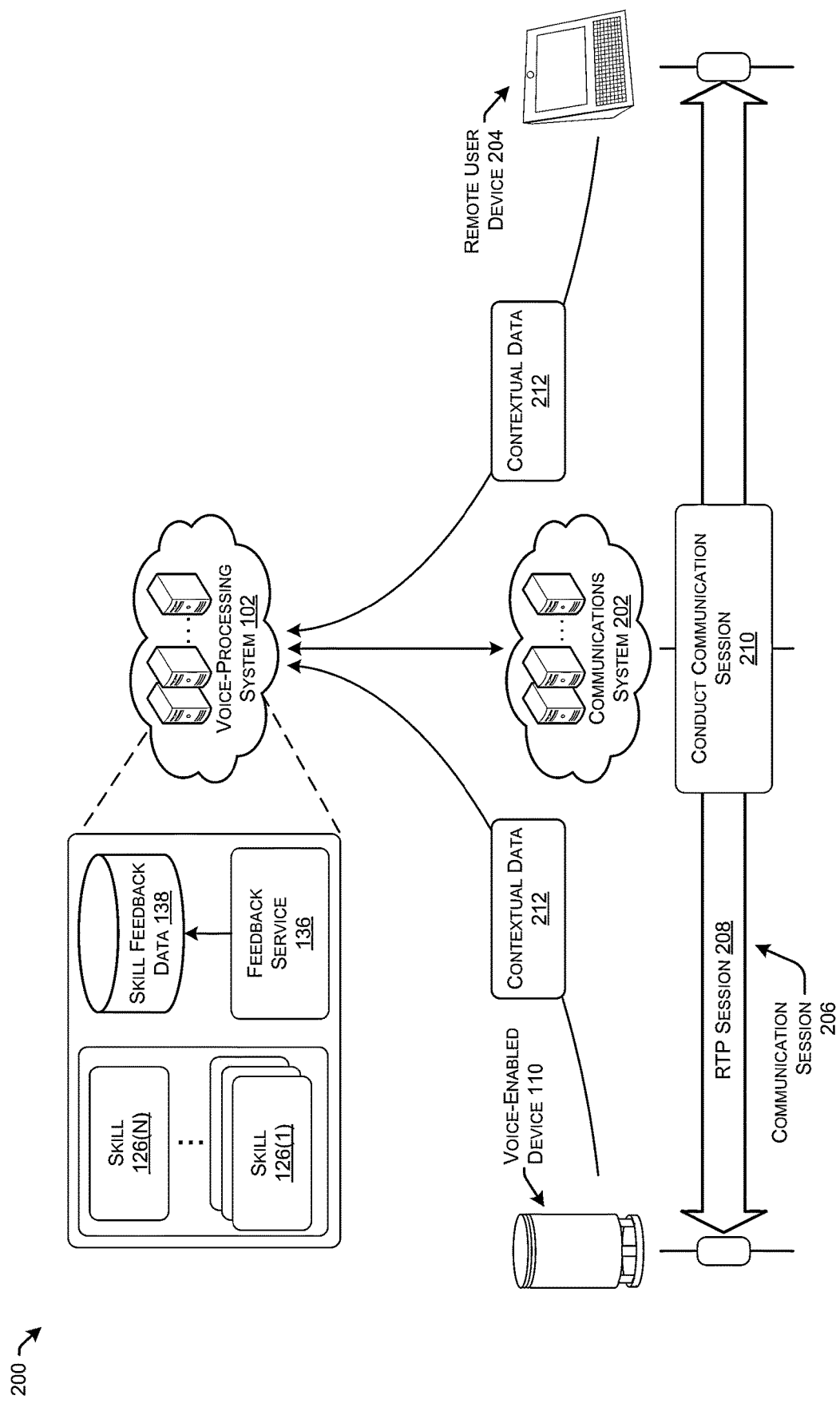
FIG. 2 illustrates an example architecture in which a communications system established a communication session between devices, and provides contextual data about the communication session to a voice-processing system.

FIG. 2 illustrates an example architecture 200 in which a communications system 202 establishes a communication session between devices, and provides contextual data about the communication session to a voice-processing system 102.

In some examples, the communications system 202 may be configured to establish flows of data between devices, such as voice calls and/or video calls using Voice over Internet Protocol (VOIP) and/or another protocol. For example, the communications system 202 may receive a command from the voice-processing system 102 that instructs the communications system 202 to facilitate or establish a communication session 206 between a voice-enabled device 110 and a remote user device 204. In some examples, the voice-processing system 102 may have received audio data 114 from the voice-enabled device 110 (or another device) that indicates a user 104 would like a virtual assistant to establish a communication session 206 between the voice-enabled device 110 and a contact of the user 104 that is associated with the remote user device 204.

The voice-enabled device 110 may have a publicly accessible IP address and may be configured to establish a Real-Time Transport Protocol (RTP) communication session 208 directly with the remote user device 204. To enable the voice-enabled device 110 to establish the RTP communication session, the communications system 202 may include Session Traversal of User Datagram Protocol (UDP) Through Network Address Translators (NATs) server(s) (e.g., STUN server(s)). The STUN server(s) may be configured to allow NAT clients (e.g., a voice-enabled device 110 behind a firewall) to setup calls to a VoIP provider hosted outside of the local network by providing a public IP address, the type of NAT they are behind, and a port identifier associated by the NAT with a particular local port. The voice-enabled device 110 may perform IP discovery using the STUN server(s) and may use this information to set up an RTP communication session 208 (e.g., UDP communication) between the voice-enabled device 110 and the remote user device 204 to establish a call.

In some examples, the voice-enabled device 110 may not have a publicly accessible IP address. For example, in some types of NAT the voice-enabled device 110 cannot route outside of the local network. To enable the voice-enabled device 110 to establish an RTP communication session 208, the communications system 202 may include Traversal Using relays around NAT (TURN) server(s). The TURN server(s) may be configured to connect the voice-enabled device 110 to the remote user device 204 when the voice-enabled device 110 is behind a NAT. The voice-enabled device 110 may establish the RTP session 208 with the TURN server(s) and the TURN server(s) may establish an RTP session 208 with the remote user device 204. Thus, the voice-enabled device 110 may communicate with the remote user device 204 via the TURN server(s). For example, the voice-enabled device 110 may send outgoing audio data to the communications system 202 and the communications system 202 may send the outgoing audio data to the remote user device 204. Similarly, the remote user device 204 may send incoming audio/video data to the communications system 202 and the communications system 202 may send the incoming data to the voice-enabled device 110.

In some examples, the communications system 202 may establish communication sessions using a combination of the STUN server(s) and the TURN server(s). For example, a communication session 206 may be more easily established/configured using the TURN server(s), but may benefit from latency improvements using the STUN server(s). Thus, the system may use the STUN server(s) when the communication session may be routed directly between two devices and may use the TURN server(s) for all other communication sessions. Additionally, or alternatively, the system may use the STUN server(s) and/or the TURN server(s) selectively based on the communication session being established. For example, the system may use the STUN server(s) when establishing a communication session 206 between two devices (e.g., point-to-point) within a single network (e.g., corporate LAN and/or WLAN), but may use the TURN server(s) when establishing a communication session between two devices on separate networks and/or three or more devices regardless of network(s). When the communication session goes from only two devices to three or more devices, the system may need to transition from the STUN server(s) to the TURN server(s). Thus, if the system anticipates three or more devices being included in the communication session, the communication session may be performed using the TURN server(s).

Thus, the communications system 102 may at least partly conduct the communication session at 210. For example, the communications system 202 may manage or include intermediary server(s) that conduct the communication session 210, and may communicate with the voice-processing system 102 to determine commands for the session 206, such as to begin the session 208, close the session, and so forth. In various examples, the voice-enabled device 110 and/or the remote user device 204 may collect contextual data 212 for the communication session 206, such as packet loss for a voice call and/or video call, latency in the audio and/or video data packets caused by jitter, and/or other contextual data that may indicate a quality of the session 206. The voice-enabled device 110 and/or the remote user device 204 may provide the contextual data 212 for the session 206 to the voice-processing system 102. The feedback service 136 may associated the contextual data 212 with the skill 126 used to cause the session 206 to be established and facilitated by the communications system 202, such as a Video Call Skill 126 and/or a Voice Call Skill 126. In this way, once the session 206 is completed, the contextual data 212 may be utilized to help provide context as to why feedback from a user 104 may be negative. For instance, if there is a lot of jitter, and/or a lot of dropped packets, then negative feedback from the user 104 may be related to the contextual data 212. In this way, contextual data 212 may be collected by the voice-processing system 102. In some examples, the voice-processing system 102 may be associated with and/or include the communications system 202. For instance, the two systems 102 and 202 may be managed by a same entity, or at least be communicatively coupled to collect the contextual data 212.

While this is one example of collecting or determining contextual data 212 for a particular skill 126, other contextual data 212 for other skills 126 may be collected. For instance, if a user 104 requests that the virtual assistant purchase an item, and a Shopping Skill adds an extra item to a cart, or the wrong item to a cart, the cart data may be utilized as contextual data 212 to provide context as to why the user 104 may provide negative feedback for the shopping session using the Shopping Skill 126.

Figure 3:
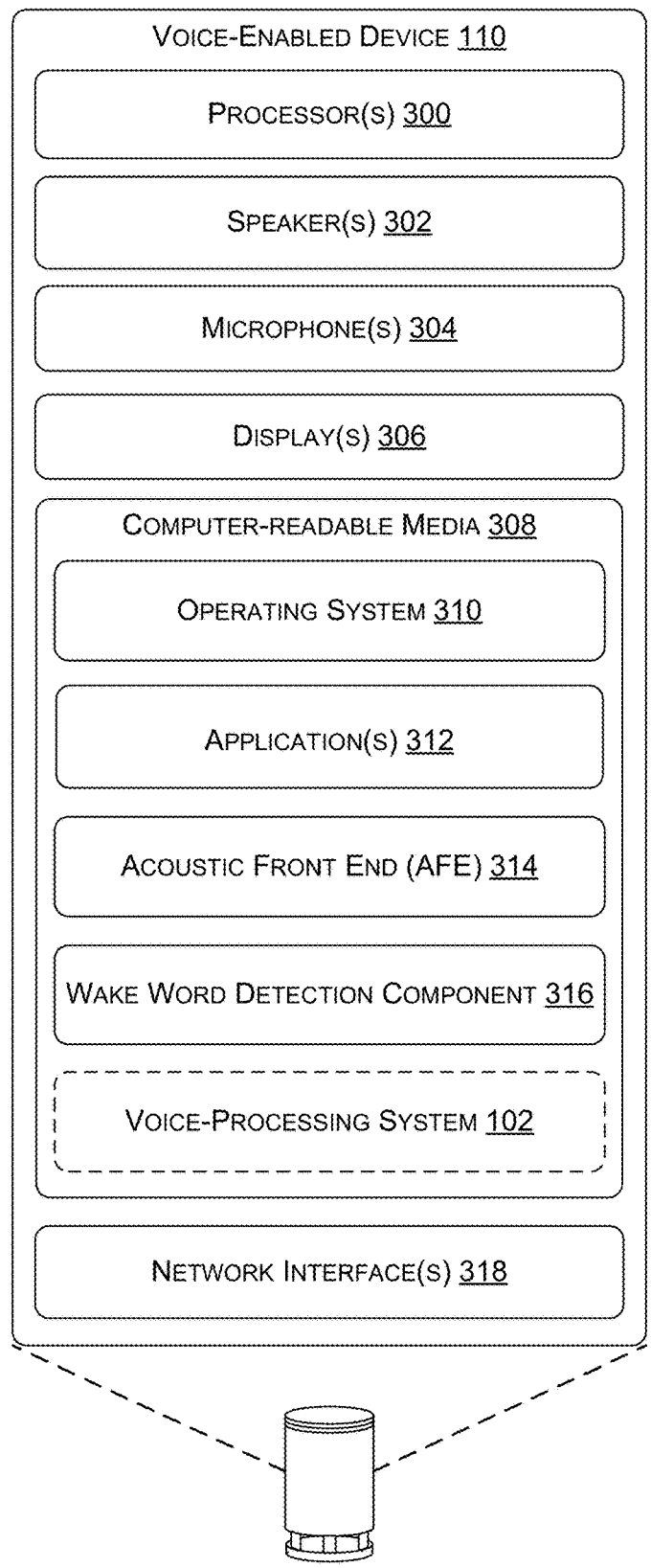
FIG. 3 illustrates a component diagram of an example voice-enabled device configured to perform the techniques described herein.

FIG. 3 illustrates a component diagram of an example voice-enabled device configured to perform the techniques described herein. The voice-enabled device shown in FIG. 3 may be the voice-enabled device 110 from FIG. 1 that interacts with a user 104 via utterances 106, such as voice commands 112.

The voice-enabled device 110 may include one or more processors 300, one or more speakers 302, and one or more microphones 304. The processors 300 may include a central processing unit (CPU), a graphics processing unit (GPU), a microprocessor, a digital signal processor, and so on. Although not illustrated, the voice-enabled device 110 may also include one or more input/output devices (e.g., mouse, keyboard, etc.), one or more displays 306 (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-enabled device 110 may be used to receive input from a user and/or to output a response.

Although the voice-enabled device 110 is illustrated as having one or more internal speakers 302, in other embodiments the voice-enabled device 110 may not include speakers 302. For example, the voice-enabled device 110 may comprise a microphone device into which a user speaks to issue commands or may comprise a device for connection to another appliance such as a television. Instead of internal speakers 302, embodiments such as this may use loudspeaker capabilities of other devices, including other voice-enabled devices that do have loudspeakers and different types of dedicated loudspeaker components. As one example, the voice-enabled device 110 may produce an audio output signal that drives an external loudspeaker. As another example, the voice-enabled device 110 may drive or control an external loudspeaker through a wireless data connection such as a Bluetooth connection. In other situations, the voice-enabled device 110 may be used in conjunction with a loudspeaker device that receives audio signals and other instructions from the system 102, rather than from the voice-enabled device 110. In this case, the response data 130 of FIG. 1 may be provided to such as loudspeaker device rather than to the voice-enabled device 110.

The microphones 304 may include sensors (e.g., transducers) configured to receive sound. The microphones 304 may generate audio data 114 for audio input (e.g., sound). For example, the microphones 304 may determine digital input signals for an utterance 106 of a user 104. In some instances, the microphones 304 are implemented in an array. The array may be arranged in a geometric pattern, such as a linear geometric form, circular geometric form, or any other configuration.

In some examples, the microphones 304 and the speakers 302 facilitate interactions, such as dialogue, with user 104. The microphones 304 produce audio signals (or audio data 114) representing sound from the environment of the voice-enabled device 110, such as utterances 106 by the user 104. The audio data 114 produced by the microphones 304 may comprise directional audio signals or may be used to produce directional audio signals, where each of the directional audio signals emphasizes audio from a different radial direction relative to the microphones 304.

The voice-enabled device 110 may include computer-readable media 308. The computer-readable media 308 may be used to store any number of software components that are executable by the processors 300. Software components stored in the computer-readable media 308 may include an operating system 310 that is configured to manage hardware and services within and coupled to the voice-enabled device 110. Additionally, the computer-readable media 308 may store one or more applications 312, such as applications for executing commands or directives generated using the skills 126. The applications 312 may collect contextual data, or metadata, for the sessions between the voice-enabled device 110 and the virtual assistant. For instance, the applications 312 may collect/determine metrics for jitter and latency for a call, and/or other metadata or contextual data.

In addition to the applications 312, the computer-readable media 308 may further store an acoustic front end (AFE) 314 for generating audio data 114 using the microphones 304, and performing some acoustic pre-processing techniques on the audio data 114. The AFE 314 may include functionality for processing microphone audio signals generated by the microphones 304 and/or output audio signals provided to the speakers 302. As an example, the AFE 314 may include an acoustic echo cancellation or suppression component for reducing acoustic echo generated by acoustic coupling between the microphones 304 and the speaker 302. The AFE 314 may also include a noise reduction component for reducing noise in received audio data 114, such as elements of microphone audio signals other than user speech.

The AFE 314 may include one or more audio beamformers or beamforming components configured to generate directional audio signals that are focused in different directions. More specifically, the beamforming components may be responsive to audio signals from spatially separated microphone elements of the microphones 304 to produce directional audio signals that emphasize sounds originating from different areas of the environment of the voice-enabled device 110 or from different directions relative to the voice-enabled device 110. The beamforming components may in some cases produce audio signal metric values (e.g., SNR values, VAD values, etc.) that may be used to determine appropriate intents and target voce-enable devices 110. For example, the beamforming components may indicate a signal strength of voice activity level corresponding to each directional audio signal.

Executable components stored in the computer-readable media 308 and executed by the processors 300 may include a wake word detection component 316 that monitors one or more of the directional audio signals to detect user utterances of the system of the trigger expression. As described above, wakeword detection may be implemented using keyword spotting technology, as an example.

The voice-enabled device 110 also has various hardware components, not shown, such as communication components, power components, I/O components, signal processing components indicators, control buttons, amplifiers, etc. For instance, rather than receiving a "wake-word" to wake up, a voice-enabled device 110 instead begin listening in response to a user 104 pressing a button on the device 110.

The voice-enabled device 110 may have one or more network interfaces 318 such as a wireless or Wi-Fi network communications interface, an Ethernet communications interface, a cellular network communications interface, a Bluetooth communications interface, etc., for communications with the remote system 110 over various types of networks 116, including wide-area network, local-area networks, private networks, public networks etc. In the case of a wireless communications interfaces, such interfaces may include radio transceivers and associated control circuits and logic for implementing appropriate communication protocols.

In some examples, some or all of the components of the voice-processing system 102 may be included in the voice-enabled device 110, as illustrated by the dashed line. For instance, rather than communicating to a remote voice-processing system 102, the voice-enabled device 110 may include some, or all, of the components of the voice-processing system 102. In this way, the voice-enabled device may perform the techniques described as being performed by the voice-processing system 102.

Figure 4A:
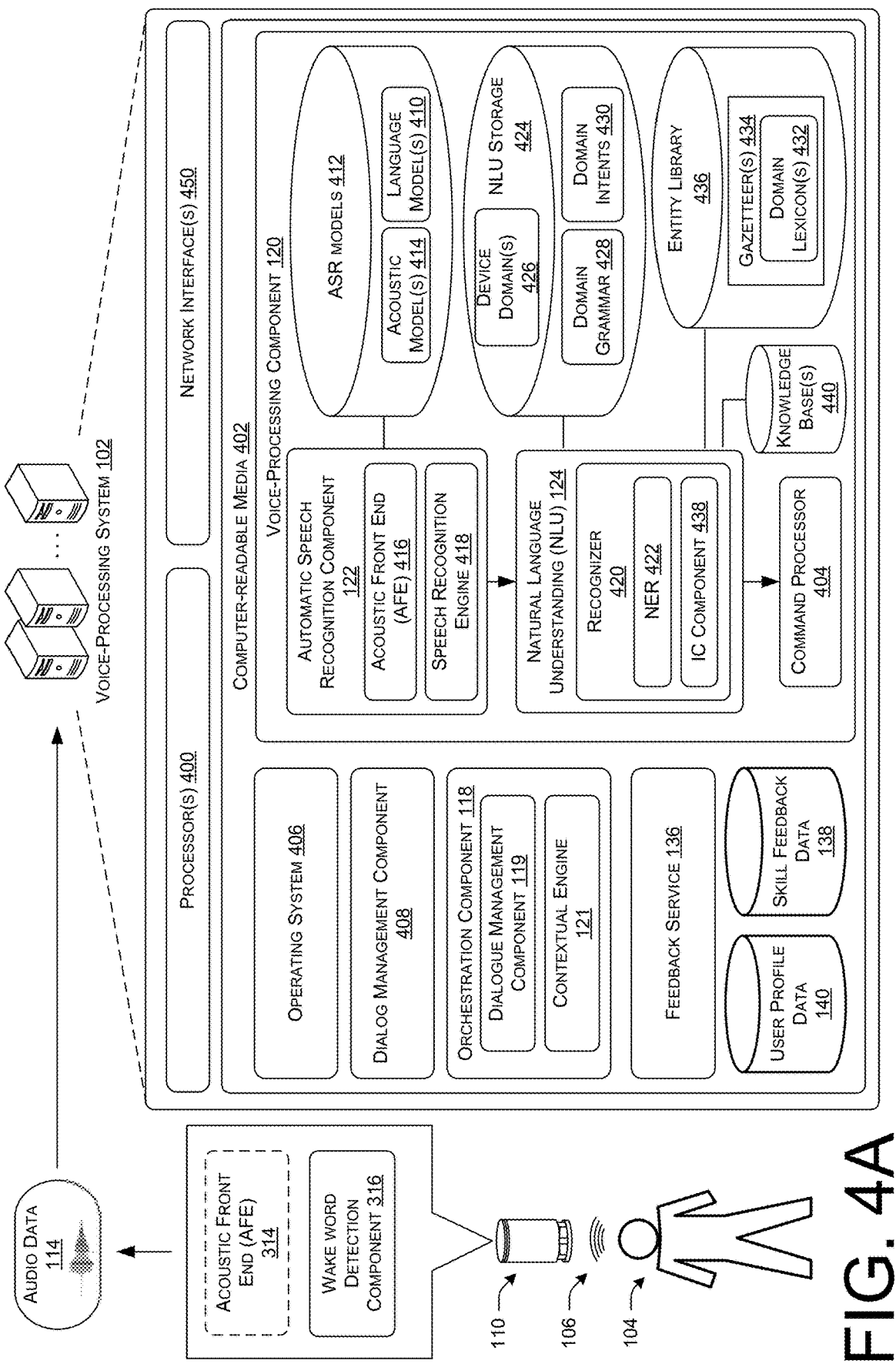
FIGS. 4A and 4B illustrate block diagrams of an example architecture of a voice-processing system which receives audio data from a voice-enabled device, causes a virtual assistant to perform an action using a skill, and collects feedback for the action performed by the virtual assistant.
Figure 4B:
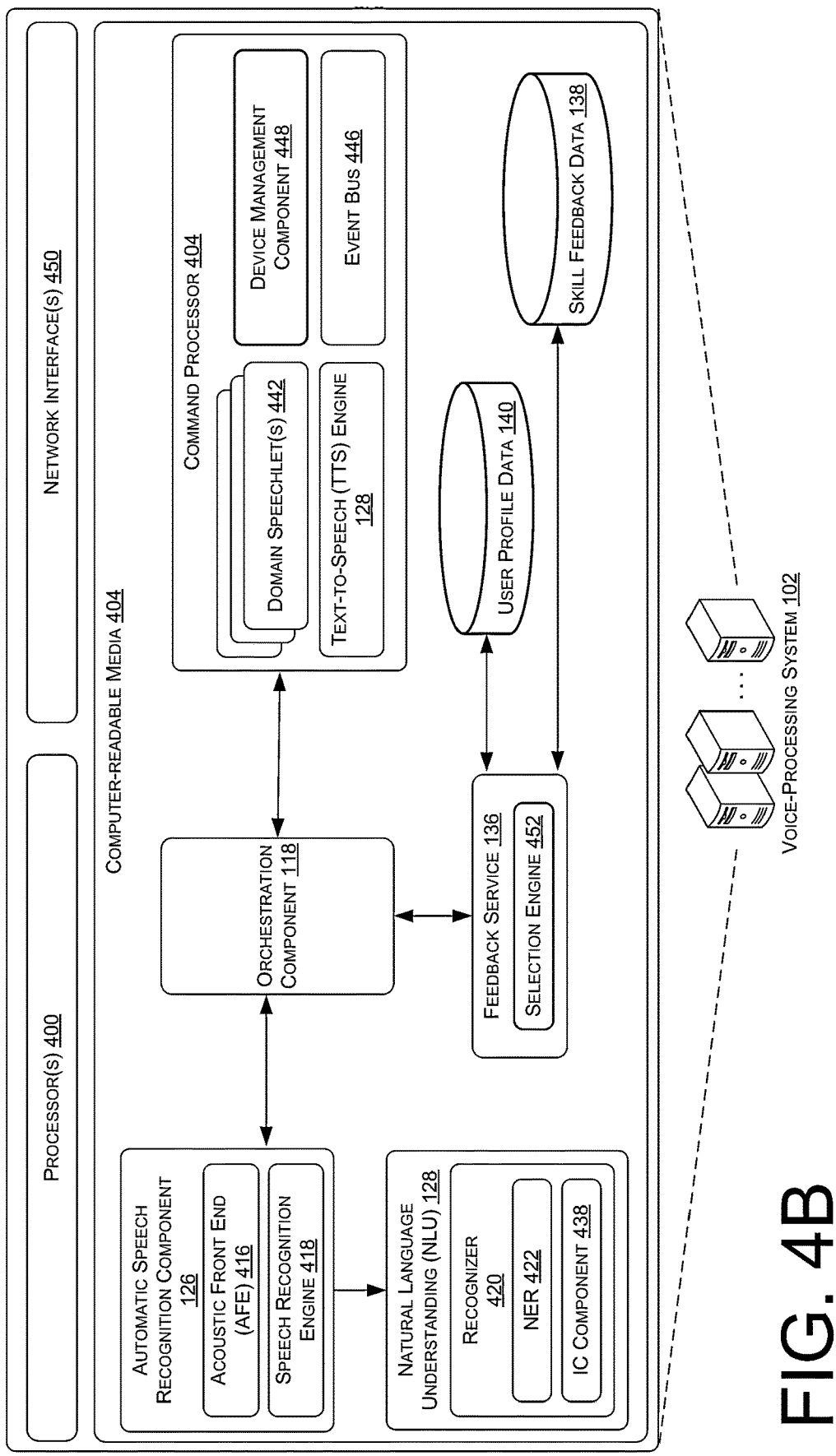

FIGS. 4A and 4B illustrate block diagrams of an example architecture of a voice-processing system 102 which receives audio data 114 from a voice-enabled device 110, causes a virtual assistant to perform an action using a skill, and collects feedback for the action performed by the virtual assistant.

FIG. 4A includes a conceptual diagram of how a speech utterance 106 can be processed, allowing a system to capture and execute commands spoken by a user 104, such as spoken commands that may follow a wakeword. The various components illustrated may be located on a same or different physical devices. Communication between various components illustrated in FIG. 4A may occur directly or across a network 116. An audio capture component, such as a microphone 304 of voice-enabled device 110, captures audio corresponding to a speech utterance 106. The voice-enabled device 110, using a wakeword detection component 316, then processes the speech utterance 106, or audio data 114 corresponding to the speech utterance 106, to determine if a keyword (such as a wakeword) is detected in the speech utterance 106. Following detection of a wakeword, the voice-enabled device 110 sends audio data 114 corresponding to the speech utterance 106, to a computing device of the voice-processing system 102 that includes the ASR component 122. The audio data 114 may be output from an acoustic front end (AFE) 314 located on the voice-enabled device 110 prior to transmission. Or, the audio data 114 may be in a different form for processing by a remote AFE 416, such as the AFE 416 located with the ASR component 122.

In various examples, the voice-processing system 102 may include one or more processors 400 to power components, devices, and actions of the voice-processing system 102, and one or more network interfaces 450 such as a wireless or Wi-Fi network communications interface, an Ethernet communications interface, a cellular network communications interface, a Bluetooth communications interface, etc., for communications by the voice-processing system 102 over various types of networks 116, including wide-area network, local-area networks, private networks, public networks etc. In the case of a wireless communications interfaces, such interfaces may include radio transceivers and associated control circuits and logic for implementing appropriate communication protocols.

The voice-processing system 102 may further include computer-readable media 402 which stores various components, components, or other executable software to perform various arbitration actions to determine which voice-enabled device is to respond to a command in the speech utterance 106. The computer-readable media may store an operating system 406 that is configured to manage hardware and services within and coupled to the voice-processing system 102.

The computer-readable media 402 may further store a dialog management component 408 that is responsible for conducting speech dialogs (e.g., dialogue session 108) with the user 104 in response to meanings or intents of user speech determined by the NLU component 124. The dialog management component may include domain logic that is used to analyze the meaning of user speech and to determine how to respond to the user speech. The dialog management component may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The computer-readable media 402 may further include the orchestration component 118, the feedback service 136, the skill feedback data 138, and the user profile data 140. The voice-processing system 102 may further include various components for processing a speech utterance 106, such as automatic speech recognition component 122 and natural language understanding component 124. The various components illustrated may be located on a same or different physical devices.

In some examples, audio data (e.g., audio data 114) may be received by the voice-processing system 102 for speech processing for interpretation of the included speech utterance 106 (either for purposes of enabling voice-communications and/or for purposes of executing a command in the speech). The audio data 114 may include data corresponding to the wakeword, or the portion of the audio data corresponding to the wakeword may be removed by the voice-enabled device 110 prior to sending. Upon receipt by the voice-processing system 102, the ASR component 122 may convert the audio data into text. The ASR component 122 transcribes audio data into text data representing the words of the speech contained in the audio data. The text data may then be used by other components for various purposes, such as arbitration, executing system commands, inputting data, etc. A speech utterance 106 in the audio data is input to a processor configured to perform ASR which then interprets the utterance based on the similarity between the utterance and pre-established ASR language models stored in an ASR model knowledge base (ASR Models Storage 412). For example, the ASR process may compare the input audio data with models for sounds (e.g., subword units or phonemes) and sequences of sounds to identify words that match the sequence of sounds spoken in the utterance of the audio data.

The different ways a speech utterance 106 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 414 stored in an ASR Models Storage 412), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 122 outputs the most likely text recognized in the audio data. The ASR component 122 may also output multiple ASR hypotheses in the form of a lattice or an N-best list with each hypothesis corresponding to an ASR confidence score or other score (such as probability scores, etc.).

In various examples, the ASR confidence scores may be provided to the feedback service 136, which in turn maps the ASR confidence scores to the skill 126 that is invoked for responding to the utterance 106. In this way, metadata or contextual data provided as feedback for the skills 126 may include an indication of how confidently the ASR component 122 was in transcribing the utterance 106. In some examples, the lower the ASR confidence score, the more likely it is that the utterance 106 will not be responded to properly. Thus, a low ASR confidence score may be useful to determine why negative feedback was received from a user 104 regarding a skill 126 that was, for example, unable to appropriately respond to the user 104.

The device or devices performing the ASR processing may include an acoustic front end (AFE) 416 and a speech recognition engine 418. The acoustic front end (AFE) 416 transforms the audio data from the microphone into data for processing by the speech recognition engine 418. The speech recognition engine 418 compares the speech recognition data with acoustic models 414, language models 410, and other data models and information for recognizing the speech conveyed in the audio data. The AFE 416 may reduce noise in the audio data and divide the digitized audio data into frames representing time intervals for which the AFE 416 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 416 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 418 may process the output from the AFE 416 with reference to information stored in speech/model storage (412). Alternatively, post front-end processed data (such as feature vectors) may be received by the device executing ASR processing from another source besides the internal AFE 416. For example, the voice-enabled device 110 may process audio data into feature vectors (for example using an on-device AFE 416) and transmit that information to a server across a network for ASR processing. Feature vectors may arrive at the voice-processing system 102 encoded, in which case they may be decoded prior to processing by the processor executing the speech recognition engine 418.

The speech recognition engine 418 attempts to match received feature vectors to language phonemes and words as known in the stored acoustic models 414 and language models 410. The speech recognition engine 418 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 418 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 418 to other processing components, which may be local to the device performing ASR and/or distributed across the network(s). For example, ASR results in the form of a single textual representation of the speech, an N-best list including multiple hypotheses and respective scores, lattice, etc. may be sent to the voice-processing system 102, for natural language understanding (NLU) processing, such as conversion of the text into commands for execution, either by the user device, by the voice-processing system 102, or by another device (such as a server running a specific application like a search engine, etc.).

The NLU component 124 (e.g., server) may include various components, including potentially dedicated processor(s), memory, storage, etc. As shown in FIG. 4A, the NLU component 124 may include a recognizer 420 that includes a named entity recognition (NER) component 422 which is used to identify portions of query text that correspond to a named entity that may be recognizable by the system. A downstream process called named entity resolution links a text portion to a specific entity known to the system. To perform named entity resolution, the system may utilize gazetteer information 434 stored in entity library storage 436. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 124 takes textual input (such as the textual input determined by the ASR component 122) and attempts to make a semantic interpretation of the text. That is, the NLU component 124 determines the meaning behind the text based on the individual words and then implements that meaning. NLU component 124 interprets a text string to derive an intent or a desired action from the user as well as the pertinent pieces of information in the text that allow a device (e.g., voice-enabled device 110) to complete that action. For example, if a spoken utterance is processed using ASR component 122 and outputs the text "turn off the alarm" the NLU component 124 may determine that the user 104 intended that the voice-enabled device 110 be instructed to turn off an alarm sound being output. As another example, if the spoken utterance is processed using ASR component 122 and outputs the text "hang up the call" the NLU component 124 may determine that the user 104 intended that the voice-enabled device 110 be instructed to hang up a device through which a phone call is being performed.

The NLU component 124 may process several textual inputs related to the same utterance. For example, if the ASR component 122 outputs N text segments (as part of an N-best list), the NLU component 124 may process all N outputs to obtain NLU results.

To correctly perform NLU processing of speech input, the NLU component 124 may be configured to determine a "domain" of the utterance so as to determine and narrow down which services offered by the endpoint device (e.g., voice-processing system 102 or the voice-enabled device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 422 receives a query in the form of ASR results and attempts to identify relevant grammars and lexical information that may be used to construe meaning. To do so, the NLU component 124 may begin by identifying potential domains that may relate to the received query. The NLU storage 424 includes a database of devices domains 426 which identify domains associated with specific devices. For example, the voice-enabled device 110 may be associated with domains for music, telephony, calendaring, contact lists, and device-specific communications, but not video. In addition, the device domains 426 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 420, language model and/or grammar databases 428, a particular set of domain intents/actions 430, and a particular personalized domain lexicon 432. Each gazetteer 434 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 438 parses the query to determine an intent or intents for each identified domain, where the intent corresponds to the action to be performed that is responsive to the query. Each domain is associated with a database (e.g., domain intents 430) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 438 identifies potential intents for each identified domain by comparing words in the query to the words and phrases in the domain intents database 430. In some instances, the determination of an intent by the IC component 438 is performed using a set of rules or templates that are processed against the incoming text to identify a matching intent.

In order to generate a particular interpreted response, the NER 422 applies the grammar models and lexical information associated with the respective domain to actually recognize a mention one or more entities in the text of the query. In this manner, the NER component 422 identifies "slots" (i.e., particular words in query text) that may be needed for later command processing. Depending on the complexity of the NER component 422, it may also label each slot with a type of varying levels of specificity (such as noun, place, city, artist name, song name, or the like). Each grammar model 428 includes the names of entities (i.e., nouns) commonly found in speech about the particular domain (i.e., generic terms), whereas the lexical information 432 from the gazetteer 434 is personalized to the user(s) and/or the device. For instance, a grammar model associated with the shopping domain may include a database of words commonly used when people discuss shopping.

The intents identified by the IC component 438 are linked to domain-specific grammar frameworks (included in 430) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (428) framework or frameworks may correspond to sentence structures such as "Send a message to {contact}," "Send a voice message to {contact}," "Send the following to {contact}," etc.

For example, the NER component 422 may parse the query to identify words as subject, object, verb, preposition, etc., based on grammar rules and/or models, prior to recognizing named entities. The identified verb may be used by the IC component 438 to identify intent, which is then used by the NER component 422 to identify frameworks. A framework for the intent of "send a message," meanwhile, may specify a list of slots/fields applicable to play the identified "contact" and any object modifier (e.g., specifying a device of the recipient) or the like. The NER component 422 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 422 may search the database of generic words associated with the domain (in the knowledge base 440). So, for instance, if the query was "send message to Joe," after failing to determine a last name for "Joe," the NER component 422 may search the domain vocabulary for the word "Joe." In the alternative, generic words may be checked before the gazetteer information, or both may be tried, potentially producing two different results.

In some examples, the IC component 438 may identify multiple possible intents for each device domain(s) 426 model. As part of the process for determining intents, the IC component 438 may further determine confidence values for the different intents determines for the text data. The IC component 438 may determine, based on for example how well the text data matches to frameworks including the list of slots/fields in the domain-specific grammar frameworks included in the domain intents 430. For instance, the IC component 438 may determine how well the words in the text data received from ASR, such as a subject, verb, preposition, etc., match with corresponding frameworks of slots/fields for the determined intents. In addition to matching words between the text data received from the ASR component 122 and the words included in the slots/fields of the intent frameworks in the domain intents 430, the IC component 438 may compare the proximity, order, etc., of the words in the text data with the framework of slots/fields. Based on how well the text data matches or aligns with the frameworks of slots/fields for the multiple intents, different intent confidence values may be determined. For example, if the words, order of the words, proximity of the words, etc., match well with a framework of slots/fields for an intent, the intent confidence score for the corresponding intent may be a higher intent confidence score, and vice-versa.

The output data from the NLU component 124 (which may include tagged text, commands, etc.) may then be sent to the command processor 404. The destination command processor 404 may be determined based on the NLU output. For example, if the NLU output includes a command to send a message, the destination command processor 404 may be a message sending application, such as one located on the user device or in a message sending appliance, configured to execute a message sending command. If the NLU output includes a search request, the destination command processor 404 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 124 during runtime operations where NLU operations are performed on text (such as text output from an ASR component 122). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 420. Each recognizer may include various NLU components such as an NER component 422, IC component 438 and other components such as an entity resolver, or other components.

As noted above, multiple devices may be employed in a single voice-processing system 102. In such a multi-device system, each of the devices may include different components for performing different aspects of the speech processing. The multiple devices may include overlapping components. The components of the voice-enabled device 110 and the voice-processing system 102, as illustrated herein are exemplary, and may be located in a stand-alone device or may be included, in whole or in part, as a component of a larger device or system, may be distributed across a network or multiple devices connected by a network, etc.

FIG. 4B illustrates a block diagram of an example architecture of the voice-processing system 102 including the command processor 404 configured to generate a command that the voice-enabled device 110 uses to respond to the speech utterance 106, and to collect feedback for skills 126 of a virtual assistant. As illustrated in FIG. 4B, the voice-processing system 102, including the orchestration component 118, the ASR component 122, and the NLU component 124, may be coupled to the feedback service 136.

The command processor 404 and/or NLU component 124 may determine a domain based on the intent and, based on this determination, route the request corresponding to the audio data to the appropriate domain speechlet, such as the illustrated domain speechlets 442. In some examples, one or more of the domain speechlets 442 may correspond to skills 126 of the virtual assistant. The domain speechlet 442 may comprise any type of device or group of devices (e.g., hardware device, virtual devices or partitions, server, etc.), and may receive the text data and/or an intent associated with the audio data 114 and determines how to respond to the request. For instance, the intent for a command "please hang up my phone call" may be routed to a smart home domain speechlet 442 which controls devices connected to the voice-enabled devices 108, such as a phone through which a phone call is being conducted. The smart home domain speechlet 442 may determine a command to generate based on the intent of the user 104 to hang up a phone call. Additionally, the smart home domain speechlet 442 may determine additional content, such as audio data, to be output by the voice-enabled devices 110, such as "we have hung up your phone call."

Various types of domain speechlets 442 may be used to determine which devices 108 to use to respond to a speech utterance 106, as well as the appropriate response 130 and potential additional content (e.g., audio data). For example, the domain speechlets 442 may include a third party skills domain speechlet 442 which may handle intents associated with gaming, productivity, etc., a music domain speechlet 442 which may handle intents associated with music play requests (e.g., Amazon Music, Pandora, Spotify, iHeart, etc.), a video domain speechlet 442 which may handle intents associated with video play requests (e.g., Amazon Video, HBO, Netflix, Hulu, etc.), a household organization domain speechlet 442 which may handle intents associated with household activities (e.g., calendars, reminders, timers, etc.), a smart home domain speechlet 442 which may handle intents associated with controlling smart devices (e.g., controlling lights, door locks, home monitoring, etc.), an automotive domain speechlet 442, a shopping domain speechlet 442 which may handle shopping requests (e.g., making a shopping list, ordering items online, etc.), and/or a weather domain speechlet 442 which may handle requests for weather forecasts (e.g., providing a URL to a weather website, providing weather related images and/or videos, etc.).

After the domain speechlet 442 generates the appropriate command based on the intent of the user 104, and/or provides additional content, such as audio data, to be output by one of the voice-enabled devices 108 (e.g., "we have hung up your phone call"), the domain speechlet 442 may provide this information back to the voice-processing system 102, which in turns provides some or all of this information to a text-to-speech (TTS) engine 128. The TTS engine 128 then generates an actual audio file for outputting the second audio data determined by the domain speechlet 442 (e.g., "we have hung up your phone call", or "we have turned off your alarm . . . "). After generating the file (or "audio data"), the TTS engine 128 may provide this data back to the voice-processing system 102.

The voice-processing system 102 may then publish (i.e., write) some or all of this information to an event bus 446. That is, the voice-processing system 102 may provide information regarding the initial request (e.g., the speech, the text, the domain/intent, etc.), the response to be provided to the voice-enabled device 110 (e.g., the command to hang up a phone call, the command to turn off an alarm, etc.), or any other information pertinent to the interaction between the voice-enabled device 110 and the voice-processing system 102 to the event bus 446.

Within the voice-processing system 102, one or more components or services may subscribe to the event bus 446 so as to receive information regarding interactions between user devices and the voice-processing system 102. In the illustrated example, for instance, the feedback service 136 may subscribe to the event bus 446 and, thus, may monitor information regarding these interactions. In some examples, monitoring information in the event bus 446 may comprise communications between various components of the voice-processing system 102. For example, the feedback service 136 may monitor the event bus 446 to identify completion dialogues or intents for sessions between users 104 and the virtual assistant. In some examples, the event bus 446 may "push" or send indications of events and/or completion dialogues and/or intents to the feedback service 136. Additionally, or alternatively, the event bus 446 may be "pulled" where the feedback service 136 sends requests to the event bus 446 to provide an indication of completion dialogues and/or intents for session involving a voice-enabled device 110.

The device management component 448 functions to monitor information published to the event bus 446 and identify events that may trigger action. For instance, the device management component 448 may identify (e.g., via filtering) those events that: (i) come from voice-enabled devices 110 that are associated with user accounts or profiles for receiving feedback using the feedback service 136.

Finally, the device management component 448 may determine how to transmit response and/or supplement content (and/or information acquiring the content) to the voice-enabled devices 110 and/or the secondary devices. To make this determination, the device management component 448 may determine a device type of the voice-enabled devices 108 and/or secondary devices, capabilities of the device(s), or the like, potentially as stored in the user profile data 140. In some instances, the device management component 448 may determine that a particular device is able to communicate directly with the voice-processing system 102 (e.g., over WiFi) and, thus, the device management component 448 may provide the response and/or content directly over a network 116 to a secondary device (potentially via the voice-processing system 102). In another example, the device management component 448 may determine that a particular secondary device is unable to communicate directly with the voice-processing system 102, but instead is configured to communicate with a voice-enabled device 110 in its environment over short-range wireless networks. As such, the device management component 448 may provide the supplement content (or information) to the voice-processing system 102, which in turn may send this to the voice-enabled device 110, which may send the information over a short-range network to the secondary device.

As used herein, a processor, such as processor(s) 300 and/or 400, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 300 and/or 400 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 300 and/or 400 may possess its own local memory, which also may store program components, program data, and/or one or more operating systems.

As described herein, computer-readable media 308 and/or 402 may include volatile and nonvolatile memory, removable and non-removable media implemented in any method or technology for storage of information, such as computer-readable instructions, data structures, program component, or other data. Such computer-readable media 308 and/or 402 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 300 and/or 400 to execute instructions stored on the computer-readable media 308 and/or 402. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 308 and/or 402, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Each of the network interface(s) 318 and network interface(s) 450 may enable communications between the voice-enabled device 110 and the voice-processing system 102, as well as other networked devices. Such network interface(s) can include one or more network interface controllers (NICs) or other types of transceiver devices to send and receive communications over a network.

In various examples, the feedback service 136 includes a selection engine configured to select a user 104 and/or skill 126 for feedback. For instance, the selection engine 452 may be configured to utilize one or more heuristics to determine whether or not to request feedback from a particular user 104 based on various data, such as user profile data 140 and/or skill feedback data 138. For instance, the selection engine 452 may determine a frequency at which a user, or user profile, has been prompted for feedback regarding all of the skills 126(N) of the virtual assistant, and determine if the frequency is below some threshold frequency. In this way, the selection engine 452 may request feedback from users 104 when appropriate, and not bombard the users 104 with requests. For example, the threshold frequency may be set at two times in a seven-day period, and if the user 104 has not been asked more than two times in the seven-day period, the selection engine 452 may select the user 104 to provide feedback for a skill 126. Additionally, the selection engine 452 may utilize a heuristic to determine whether to request feedback from a user 104 based on a participation rating for the user 104, such as a feedback history for the user profile associated with the voice-enabled device 110. The participation rating may indicate how willing a user 104 is to provide feedback, such as a frequency or percentage at which the user profile provided feedback for the skill interfaces when prompted by the virtual assistant, requests that the user 104 be prompted for feedback in the future, etc. A more willing user 104 may be prompted for feedback more often. As another example, the selection engine 452 may determine whether or not to request feedback from a user 104 based on the user profile data 140 including demographic information that corresponds to a characteristic of users from which feedback is to be requested for the skill 126. For example, the skill 126 may request that users 104 with certain demographics be prompted for feedback more often than other users 104 without the desirable demographics for that skill 126.

In some examples, the selection engine 452 of the feedback service 136 may utilize one, or multiple, of the above-noted heuristics (and/or other heuristics) to determine whether or not to request that a particular user 104 give feedback for a particular skill 126. The selection engine 452 may weigh the various heuristics to make a final determination as to whether to ask a particular user 104 for feedback regarding a particular skill 126.

For instance, each of the net network interface(s) 318 and network interface(s) 450 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 318 and network interface(s) 450 may include a wide area network (WAN) component to enable communication over a wide area network. The network 116 may represent an array of wired networks, wireless networks, such as WiFi, or combinations thereof.

FIGS. 5A, 5B, 6, and 7 illustrate flow diagrams of example methods 500, 600, and 700 that illustrate aspects of the functions performed at least partly by the voice-processing system 102 and/or voice-enabled device 110 as described in FIGS. 1-4B. The logical operations described herein with respect to FIGS. 5A, 5B, 6, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, 6, and 7 described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5A:
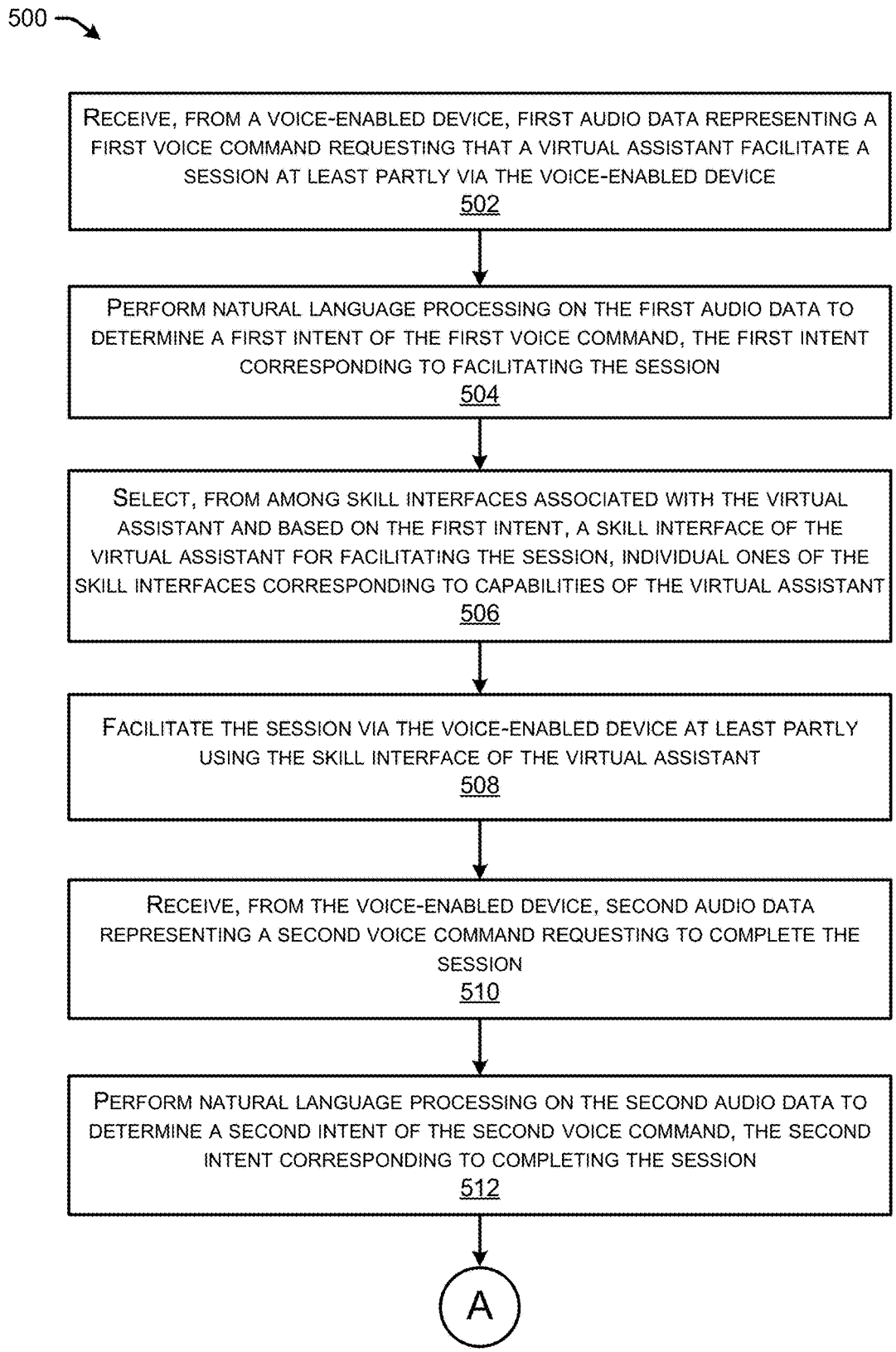
FIGS. 5A and 5B illustrate a flow diagram of an example method performed by a system for receiving a voice command from a user to facilitate a session, using a skill of a virtual assistant to facilitate the session, and after completion of the session, collecting feedback from the user and contextual data for the session.
Figure 5B:
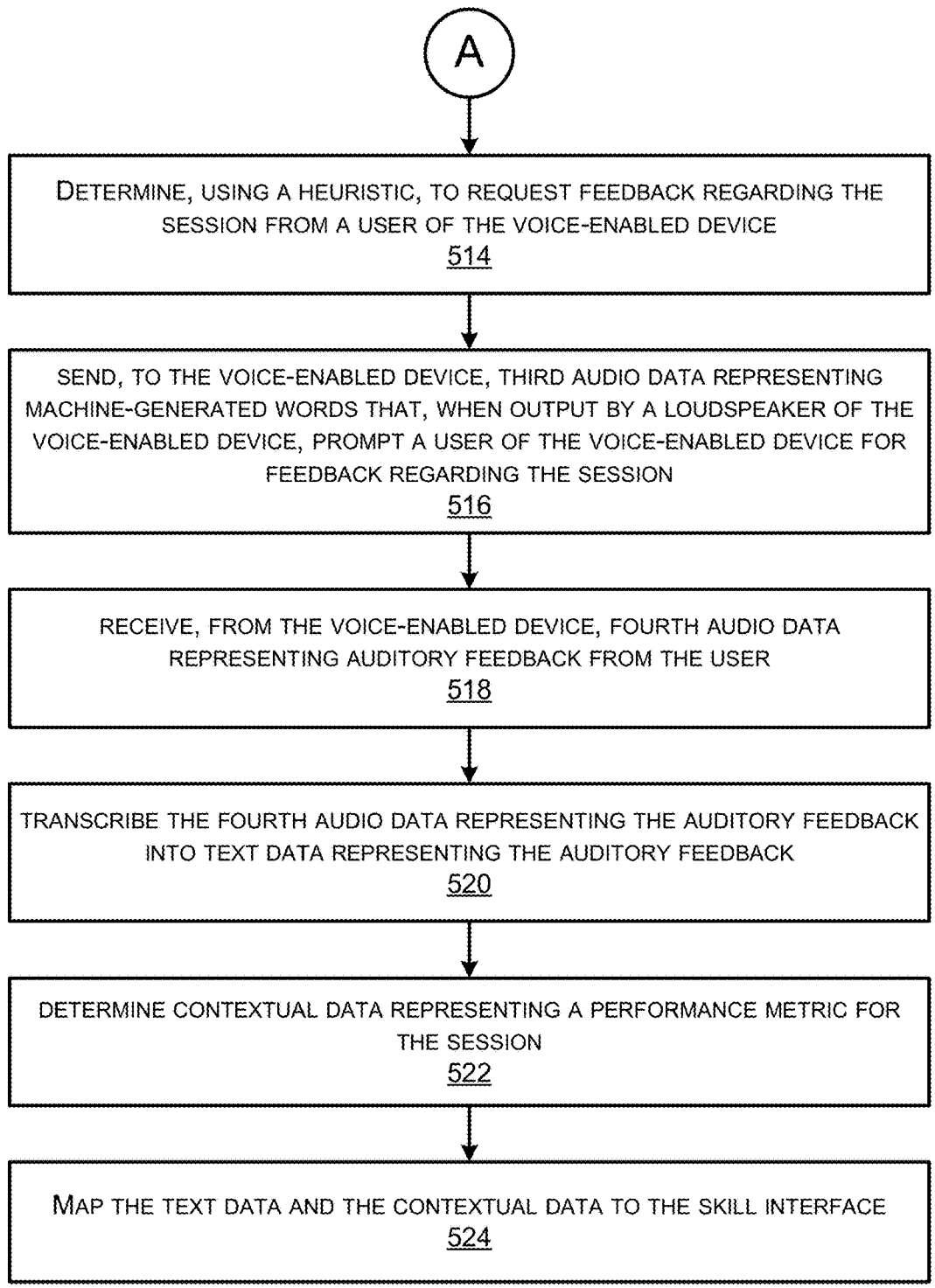

FIGS. 5A and 5B illustrate a flow diagram of an example method 500 performed by a system for receiving a voice command from a user to facilitate a session, using a skill of a virtual assistant to facilitate the session, and after completion of the session, collecting feedback from the user and contextual data for the session.

At 502, a voice-processing system may receive, from a voice-enabled device, first audio data representing a first voice command requesting that a virtual assistant associated with the system facilitate a session at least partly via the voice-enabled device. At 504, the voice-processing system may perform natural language processing on the first audio data to determine a first intent of the first voice command, the first intent corresponding to facilitating the session.

At 506, the voice-processing system may select, from among skill interfaces associated with the virtual assistant and based on the first intent, a skill interface of the virtual assistant for facilitating the session, individual ones of the skill interfaces corresponding to capabilities of the virtual assistant.

At 508, the voice-processing system may, at least partly using the skill interface of the virtual assistant, facilitate the session via the voice-enabled device. at 510, the voice-processing system may receive, from the voice-enabled device, second audio data representing a second voice command requesting to complete the session.

At 512, the voice-processing system may perform natural language processing on the second audio data to determine a second intent of the second voice command, the second intent corresponding to completing the session. At 514, the voice-processing system may determine, using a heuristic, to request feedback regarding the session from a user of the voice-enabled device.

In some examples, determining, using the heuristic, to request feedback regarding the session from the user of the voice-enabled device may include determining a frequency at which the user profile has been prompted for feedback regarding the skills, and determining that the frequency is below a threshold frequency. Additionally, or alternatively, determining, using the heuristic, to request feedback regarding the session from the user of the voice-enabled device may include determining a participation rating based at least in part on a feedback history for the user profile, the participation rating indicating a frequency at which the user profile has provided feedback for the skills, and selecting, from among multiple requests for feedback, the request for feedback based at least in part on the participation rating for the user profile.

Additionally, or alternatively, determining, using the heuristic, to request feedback regarding the session from the user of the voice-enabled device may include determining that the user profile includes demographic information that corresponds to a characteristic of users from which feedback is to be requested for the skill. Further, in some examples, determining, using the heuristic, to request feedback regarding the session from the user of the voice-enabled device may include may include determining a number of times that a user profile has invoked the skill to perform an action, and determining that the number of times is greater than or equal to a threshold number of times associated with requesting feedback for the skill.

At 516, the voice-processing system may send, to the voice-enabled device, third audio data representing machine-generated words that, when output by a loudspeaker of the voice-enabled device, prompt a user of the voice-enabled device for feedback regarding the session.

At 518, the voice-processing system may receive, from the voice-enabled device, fourth audio data representing auditory feedback from the user. At 520, the voice-processing system may transcribe the fourth audio data representing the auditory feedback into text data representing the auditory feedback. At 522, the voice-processing system may determine contextual data representing a performance metric for the session. At 524, the voice-processing system may map (or associate) the text data and the contextual data to the skill interface.

Figure 6:
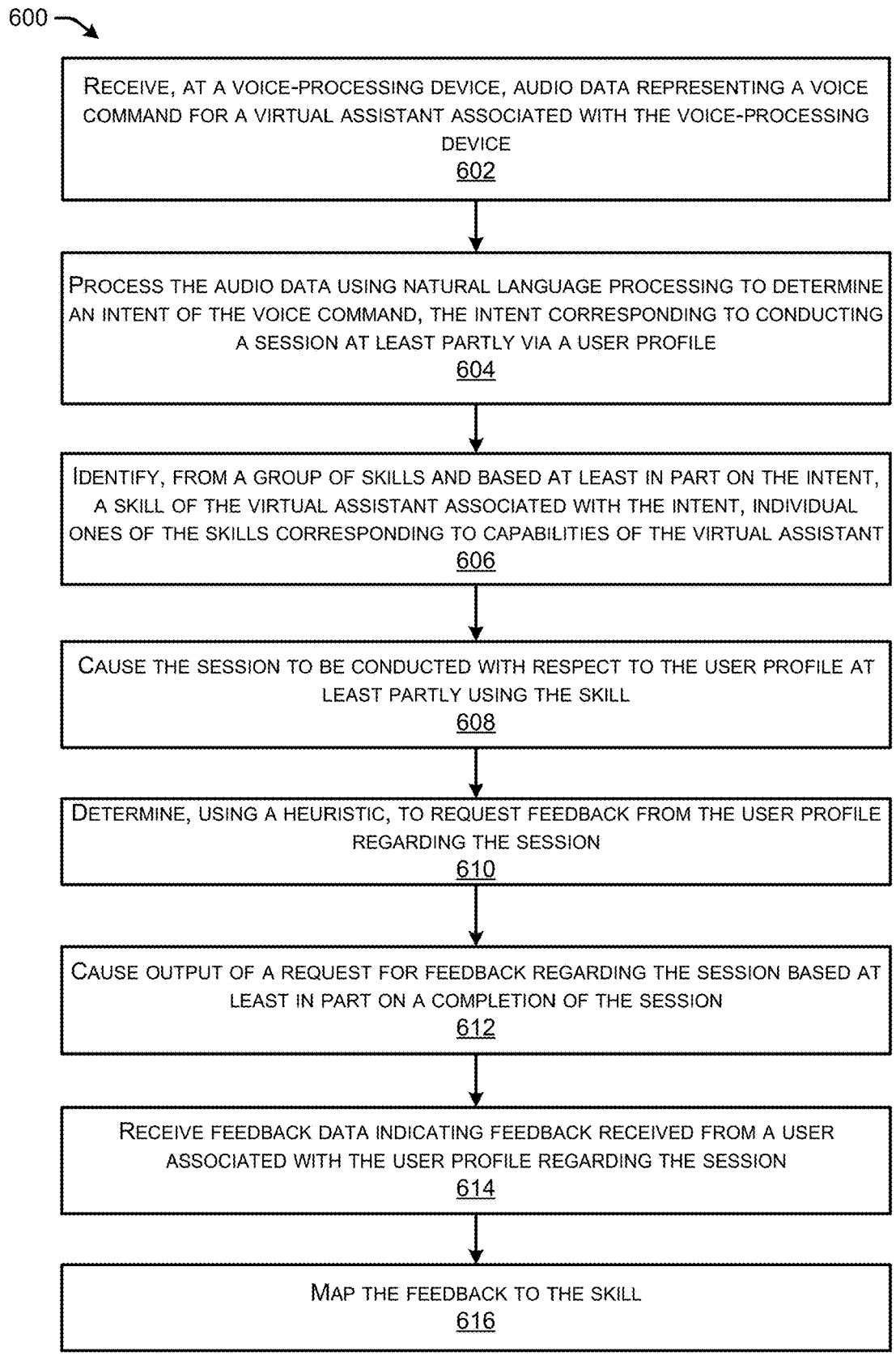
FIG. 6 illustrates a flow diagram of an example method for a user device and/or a system to use a skill of a virtual agent to conduct a session for a user profile, request feedback after completion of the session, and receive feedback from a user to be associated with the skill.

FIG. 6 illustrates a flow diagram of an example method 600 for a user device and/or a system to use a skill of a virtual agent to conduct a session for a user profile, request feedback after completion of the session, and receive feedback from a user to be associated with the skill.

At 602, at least one of a voice-enabled device 110 or a voice-processing system may receive, audio data representing a voice command for a virtual assistant associated with the voice-processing device. At 604, the at least one of a voice-enabled device 110 or a voice-processing system may process the audio data using natural language processing to determine an intent of the voice command, the intent corresponding to conducting a session at least partly via a user profile.

At 606, the at least one of a voice-enabled device 110 or a voice-processing system may identify, from a group of skills and based at least in part on the intent, a skill of the virtual assistant associated with the intent, individual ones of the skills corresponding to capabilities of the virtual assistant. At 608, the at least one of a voice-enabled device 110 or a voice-processing system may, at least partly using the skill, causing the session to be conducted with respect to the user profile.

In some examples, the method 600 may further include, at 610, determining, using a heuristic, to request feedback from the user profile regarding the session. In such examples, the voice-processing system may cause the voice-enabled device to output a request for feedback regarding the session.

At 612, the at least one of a voice-enabled device 110 or a voice-processing system may, based at least in part on a completion of the session, causing output of a request for feedback regarding the session. In some examples, outputting the request for feedback may include the use of one or more sensors. For instance, outputting the request for feedback may include presenting, on a display associated with the voice-enabled device 110, one or more prompts or fields that a user can provide input using. For instance, the display may present stars that a user can select (e.g., 1 star for bad feedback, 5 stars for good feedback, etc.). Additionally, the display may include "thumbs up" and "thumbs down" fields to allow the user 104 to select to indicate whether the session was good or bad.

At 614, the at least one of a voice-enabled device 110 or a voice-processing system may receive feedback data indicating feedback received from a user associated with the user profile regarding the session. At 61, the at least one of a voice-enabled device 110 or a voice-processing system may associate, or map, the feedback with the skill. In some examples, the feedback may include video showing facial expressions of the user 104. Based on the facial expressions (e.g., furrowed brows, frown, smiles, etc.), the feedback voice-processing system may determine whether or not the user had a good experience. Other types of feedback may be received as well, such as biometric feedback indicating that the user 104 enjoyed the session/experience or not. For instance, increased heart rate shown in heart rate data received from, for example, a wearable device may indicate that the user 104 did not enjoy the experience and was frustrated.

Figure 7:
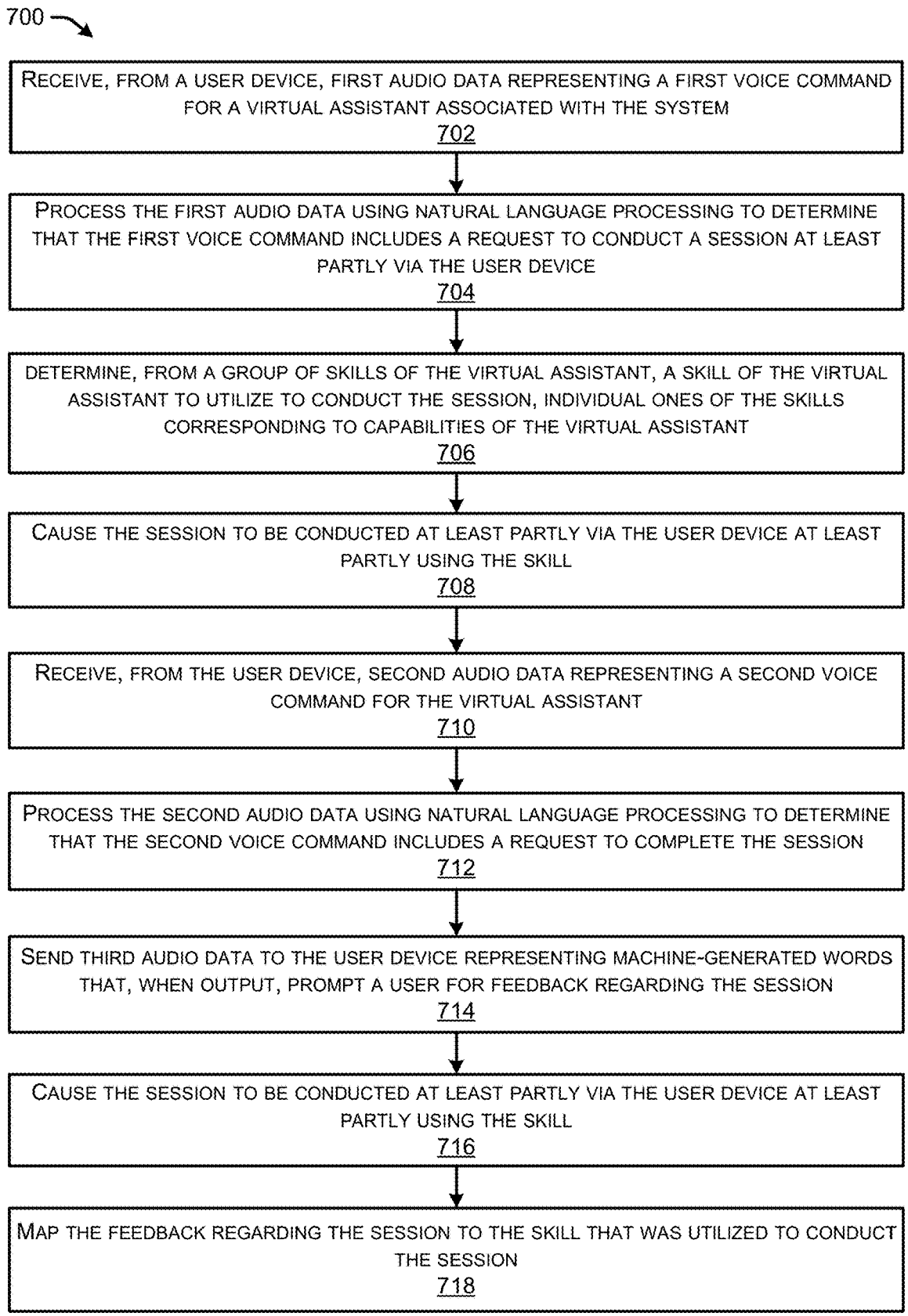
FIG. 7 illustrates a flow diagram of an example method for a system to use a skill of a virtual agent to conduct a session for a user profile, request feedback after completion of the session, and receive feedback from a user and contextual data to be associated with the skill.

FIG. 7 illustrates a flow diagram of an example method 700 for a system to use a skill of a virtual agent to conduct a session for a user profile, request feedback after completion of the session, and receive feedback from a user and contextual data to be associated with the skill.

At 702, a voice-processing system 102 may receive, from a user device, first audio data representing a first voice command for a virtual assistant associated with the system. At 704, the voice-processing system 102 may process the first audio data using natural language processing to determine that the first voice command includes a request to conduct a session at least partly via the user device.

At 706, the voice-processing system 102 may determine, from a group of skills of the virtual assistant, a skill of the virtual assistant to utilize to conduct the session, individual ones of the skills corresponding to capabilities of the virtual assistant. At 708, the voice-processing system 102 may, at least partly using the skill, cause the session to be conducted at least partly via the user device.

At 710, the voice-processing system 102 may receive, from the user device, second audio data representing a second voice command for the virtual assistant. At 712, the voice-processing system 102 may process the second audio data using natural language processing to determine that the second voice command includes a request to complete the session. At 714, the voice-processing system 102 may, based at least in part on the request to complete the session, send third audio data to the user device representing machine-generated words that, when output by the user device, prompt a user for feedback regarding the session.

At 716, the voice-processing system 102 may receive, from the user device, fourth audio data representing feedback from the user regarding the session. At 718, the voice-processing system 102 may associate the feedback regarding the session with the skill that was utilized to conduct the session.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving audio data generated by a voice-processing device and representing a voice command for a virtual assistant associated with the voice-processing device;
determining, using the audio data and natural language processing, an action that is responsive to the voice command;
identifying, from a group of skills, a skill of the virtual assistant associated with performance of the action, the skill corresponding to a capability of the virtual assistant;
at least partly using the skill, causing performance of the action;

causing the voice-processing device to output a result of the action;
determining that a user profile associated with the voice-processing device includes demographic information that corresponds to a characteristic of users from which feedback is to be requested;
determining a number of times that a user profile associated with the first device has requested performance of the action;
determining, based at least in part on the demographic information and the number of times, to request feedback from a user regarding a measure of satisfaction associated with the result of the action;
causing output of a request for the feedback regarding the measure of satisfaction associated with the result of the action;
receiving feedback data indicating feedback received from the user associated with the voice-processing device regarding the measure of satisfaction associated with the result of the action;
storing an association between the feedback and the skill; and
receiving input that includes a change to software code of the skill.

2. The computer-implemented method of claim 1, further comprising:
obtaining additional audio data representing a conversation between the user of the voice-processing device and the virtual assistant; and
determining, using the additional audio data and natural language processing, that the action was not responsive to the voice command, wherein the determining to request the feedback is performed based at least in part on the action not being responsive to the voice command.

3. The computer-implemented method of claim 1, wherein determining to request the feedback comprises determining a number of times that a user profile associated with the voice-processing device has invoked the skill of the virtual assistant to perform actions.

4. The computer-implemented method of claim 1, wherein causing the output of the request for feedback includes causing output of additional audio data using a loudspeaker of the voice-processing device, wherein the additional audio data represents machine generated words that prompts the user for the feedback.

5. The computer-implemented method of claim 1, wherein determining the action is performed at least partly using the skill of the virtual assistant, further comprising determining that the skill is associated with a tag indicating that feedback is to be requested for the skill, wherein determining to request the feedback is based at least partly responsive to the skill being associated with the tag indicating that feedback is to be requested for the skill.

6. The computer-implemented method of claim 1, wherein causing the action to be performed includes communicating additional audio data over one or more networks, further comprising determining contextual data associated with the result of the action, the contextual data comprising at least one of:
a packet loss metric associated with the audio data; or
a latency metric indicating jitter experienced by the audio data.

7. A system comprising:
one or more processors; and
one or more non-transitory computer-readable media storing computer-executable instructions that, when executed by the one or more processors, cause the one or more processors to perform operations comprising:
receiving audio data generated by a first device and representing a voice command for a virtual assistant associated with the first device;
determining, using the audio data and natural language processing, an action that is responsive to the voice command;
causing the first device to output a result of the action;
determining that a user profile associated with the first device includes demographic information that corresponds to a characteristic of users from which feedback is to be requested;
determining a number of times that a user profile associated with the first device has requested performance of the action;
determining, based at least in part on the demographic information and the number of times, to request feedback from a user regarding a measure of satisfaction associated with the result of the action;
causing output of a request for the feedback regarding the measure of satisfaction associated with the result of the action; and
receiving feedback data indicating feedback received from the user associated regarding the measure of satisfaction associated with the result of the action.

8. The system of claim 7, wherein causing the output of the request for feedback includes causing output of additional audio data using a loudspeaker of the first device, wherein the additional audio data represents machine generated words that prompt the user for the feedback.

9. The system of claim 7, the operations further comprising:
obtaining additional audio data representing a conversation between a user of the first device and the virtual assistant; and
determining, using the additional audio data and natural language processing, that the action was not responsive to the voice command, wherein the determining to request the feedback is performed based at least in part on the action not being responsive to the voice command.

10. A computer-implemented method comprising:
receiving audio data generated by a first device and representing a voice command for a virtual assistant associated with the first device;
determining, using the audio data and natural language processing, an action that is responsive to the voice command;
causing the first device to output a result of the action;
determining a number of times that a user profile associated with the first device has requested performance of the action;
determining, based at least in part on the number of times, to request feedback from a user regarding a measure of satisfaction associated with the result of the action;
causing output of a request for the feedback regarding the measure of satisfaction associated with the result of the action; and
receiving feedback data indicating feedback received from the user associated regarding the measure of satisfaction associated with the result of the action.

11. The computer-implemented method of claim 10, wherein causing the output of the request for feedback includes causing output of additional audio data using a loudspeaker of the first device, wherein the additional audio data represents machine generated words that prompt the user for the feedback.

12. The computer-implemented method of claim 10, further comprising:
   obtaining additional audio data representing a conversation between a user of the first device and the virtual assistant; and
   determining, using the additional audio data and natural language processing, that the action was not responsive to the voice command, wherein the determining to request the feedback is performed based at least in part on the action not being responsive to the voice command.

* * * * *